US008782026B2

(12) United States Patent
Poland et al.

(10) Patent No.: US 8,782,026 B2
(45) Date of Patent: Jul. 15, 2014

(54) COLOR HARMONY WITH PROCESS AND ENVIRONMENTAL FEEDBACK

(75) Inventors: Christopher Alan Poland, Milford Center, OH (US); Michael Anthony Saunders, Marysville, OH (US); Masakuni Nishino, Dublin, OH (US); Steven J. Baker, Piqua, OH (US); David Michael Wellman, Dublin, OH (US); William Gregory Peck, Grove City, OH (US); Roderick Louis Hixson, West Liberty, OH (US); John William McTighe, Dublin, OH (US); Diana Marie Bush, Grove City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 151 days.

(21) Appl. No.: 13/077,514

(22) Filed: Mar. 31, 2011

(65) Prior Publication Data

US 2012/0254141 A1 Oct. 4, 2012

(51) Int. Cl.
*G06F 17/30* (2006.01)

(52) U.S. Cl.
USPC .......................................... 707/705; 707/770

(58) Field of Classification Search
USPC .................................. 707/770, 999.003, 705
See application file for complete search history.

(56) References Cited

U.S. PATENT DOCUMENTS

| | | | | |
|---|---|---|---|---|
| 3,737,239 | A | 6/1973 | Adams et al. | |
| 5,347,463 | A * | 9/1994 | Nakamura et al. | 700/226 |
| 5,739,806 | A | 4/1998 | Hissen et al. | |
| 6,522,977 | B2 * | 2/2003 | Corrigan et al. | 702/32 |
| 6,528,109 | B1 | 3/2003 | Filev et al. | |
| 6,701,193 | B1 | 3/2004 | Filev et al. | |
| 6,714,924 | B1 | 3/2004 | McClanahan | |
| 6,804,390 | B2 | 10/2004 | McClanahan | |
| 6,936,106 | B2 | 8/2005 | Filev et al. | |
| 7,171,394 | B2 | 1/2007 | Filev | |
| 7,298,462 | B2 | 11/2007 | Udo et al. | |
| 7,860,856 | B2 | 12/2010 | Lewis | |
| 8,065,314 | B2 | 11/2011 | Prakash et al. | |
| 2003/0101933 | A1 * | 6/2003 | Filev et al. | 118/688 |
| 2003/0180442 | A1 | 9/2003 | Hopson | |
| 2005/0106328 | A1 | 5/2005 | Moore et al. | |

(Continued)

FOREIGN PATENT DOCUMENTS

| | | | |
|---|---|---|---|
| DE | 19717593 | A1 | 10/1998 |
| DE | 102007057018 | A1 | 5/2009 |

(Continued)

*Primary Examiner* — Cindy Nguyen
(74) *Attorney, Agent, or Firm* — Standley Law Group LLP

(57) ABSTRACT

A computerized system and method for analyzing color consistency on automotive parts and for providing feedback on painting processes occurring in an assembly plant. The system and method facilitates data collection and analysis at numerous points during the assembly paint processes and the identification of possible adjustments so that parts are painted within a specified tolerance. Body and bumper parts are measured during an inspection process. Measurement and colorimetric data is stored in association with an identifier for the body part or bumper. Measurements relate to equipment and paint mix variables as well as environmental variables that influence the paint results. A software application facilitates analysis of the data and troubleshooting possible causes for color discrepancies. As the color trends away from a specified standard, paint process, including environmental, changes are made, prior to the painting of parts in the bumper or body so that color mismatches are prevented.

20 Claims, 36 Drawing Sheets

(56) References Cited

U.S. PATENT DOCUMENTS

| | | | | |
|---|---|---|---|---|
| 2006/0064393 | A1 | 3/2006 | Orr | |
| 2007/0067075 | A1* | 3/2007 | McMillan et al. | 701/31.4 |
| 2008/0222005 | A1* | 9/2008 | Schickler | 705/26.8 |
| 2010/0161141 | A1 | 6/2010 | Herre et al. | |
| 2010/0319176 | A1* | 12/2010 | Stewart et al. | 29/33 R |

FOREIGN PATENT DOCUMENTS

| | | | |
|---|---|---|---|
| JP | 3-31747 | B2 | 5/1991 |
| JP | 2004-137488 | A | 5/2004 |
| JP | 2005-313077 | A | 11/2005 |
| JP | 2006-218426 | A | 8/2006 |
| WO | 2008/150378 | A1 | 12/2008 |

* cited by examiner

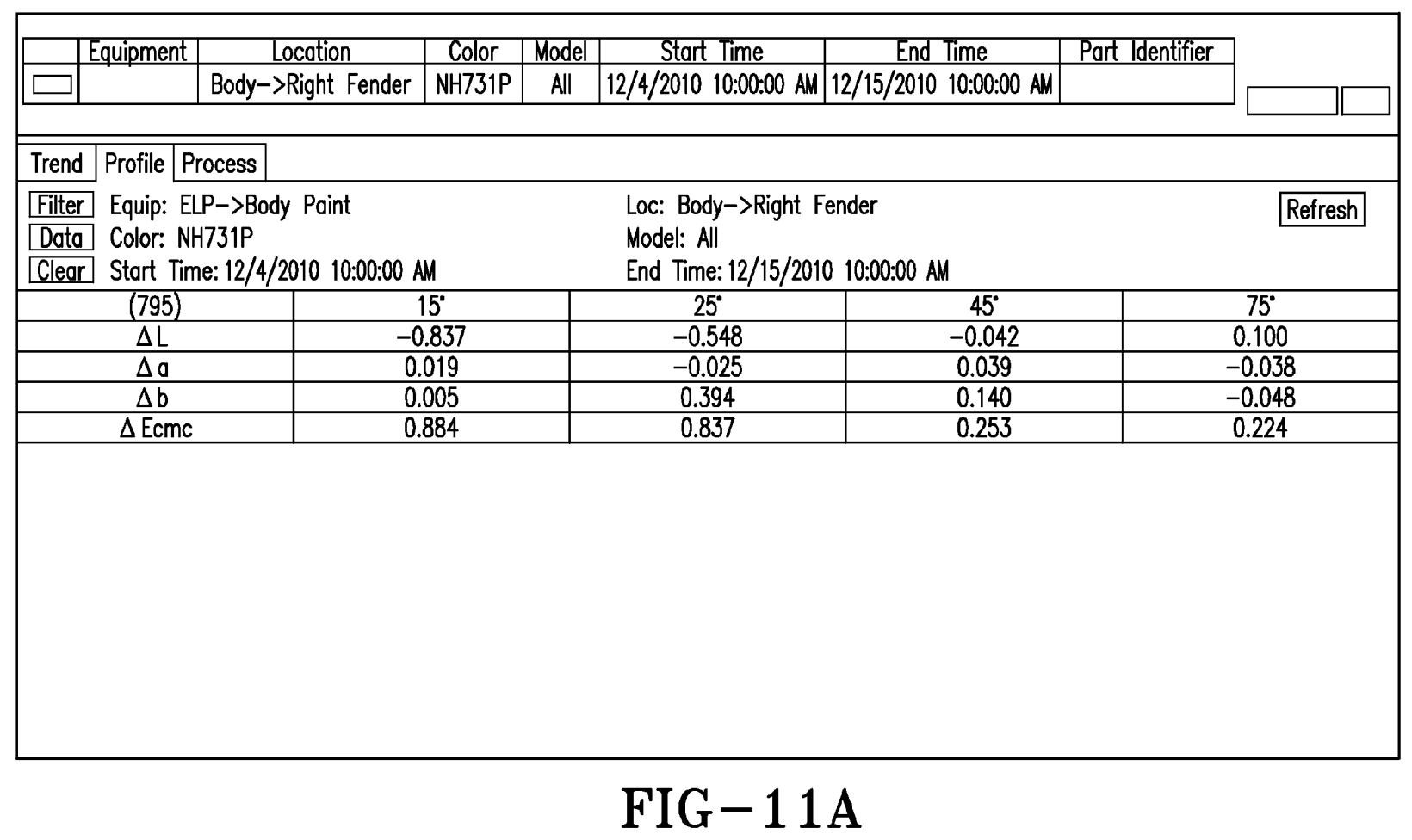

| | Equipment | Location | Color | Model | Start Time | End Time | Part Identifier |
|---|---|---|---|---|---|---|---|
| ☐ | | Body->Right Fender | NH731P | All | 12/4/2010 10:00:00 AM | 12/15/2010 10:00:00 AM | |

Trend | Profile | Process

Filter Equip: ELP->Body Paint  Loc: Body->Right Fender  Refresh

Data Color: NH731P  Model: All

Clear Start Time: 12/4/2010 10:00:00 AM  End Time: 12/15/2010 10:00:00 AM

| (795) | 15° | 25° | 45° | 75° |
|---|---|---|---|---|
| Δ L | −0.837 | −0.548 | −0.042 | 0.100 |
| Δ a | 0.019 | −0.025 | 0.039 | −0.038 |
| Δ b | 0.005 | 0.394 | 0.140 | −0.048 |
| Δ Ecmc | 0.884 | 0.837 | 0.253 | 0.224 |

FIG−11A

| B536P | | | | | |
|---|---|---|---|---|---|
| Comparison | A | B | C | D | E |
| Good | 0 | 0 | 0 | 0 | 0 |
| Fair | 0 | 0 | 0 | 0 | 0 |
| Bad | 0 | 0 | 0 | 0 | 0 |
| Total | 0 | 0 | 0 | 0 | 0 |
| Last Part | | | | | |

| B538M | | | | | |
|---|---|---|---|---|---|
| Comparison | A | B | C | D | E |
| Good | 0 | 0 | 5 | 21 | 0 |
| Fair | 8 | 8 | 8 | 0 | 0 |
| Bad | 5 | 13 | 0 | 0 | 21 |
| Total | 13 | 21 | 13 | 21 | 21 |
| Last Part | 5J6RE3H74 AL042192 | 20191747 | 5J6RE3H74 AL042192 | 20191747 | 20191747 |

| NH578 | | | | | |
|---|---|---|---|---|---|
| Comparison | A | B | C | D | E |
| Good | 0 | 0 | 0 | 0 | 0 |
| Fair | 0 | 0 | 0 | 0 | 0 |
| Bad | 0 | 0 | 0 | 0 | 0 |
| Total | 0 | 0 | 0 | 0 | 0 |
| Last Part | | | | | |

ELP->Bumper Paint
To ELP->Body Paint

| NH630P | | | | | |
|---|---|---|---|---|---|
| Comparison | A | B | C | D | E |
| [illegible] | [illegible] | 24 | 0 | 28 | 0 |
| [illegible] | [illegible] | 4 | 0 | 0 | 0 |
| Bad | 0 | 0 | 0 | 0 | 0 |
| Total | 0 | 28 | 0 | 28 | 0 |
| Last Part | | 19889888 | | 19889888 | 19889888 |

| NH737M | | | | | |
|---|---|---|---|---|---|
| Comparison | A | B | C | D | E |
| Good | 0 | 8 | 20 | 149 | 72 |
| Fair | 10 | 99 | 12 | 3 | 72 |
| Bad | 24 | 47 | 2 | 2 | 10 |
| Total | 34 | 154 | 34 | 154 | 154 |
| Last Part | 5J6RE3H32 AL042074 | 19889655 | 5J6RE3H32 AL042074 | 19889655 | 19889655 |

| R525P | | | | | |
|---|---|---|---|---|---|
| Comparison | A | B | C | D | E |
| Good | 0 | 0 | 3 | 0 | 0 |
| Fair | 3 | 0 | 12 | 0 | 0 |
| Bad | 14 | 0 | 2 | 0 | 0 |
| Total | 17 | 28 | 17 | 0 | 0 |
| Last Part | 5J6RE3H73 AL042247 | | 5J6RE3H73 AL042247 | | |

TO FIG-12B2

FIG-12B1

FROM FIG-12B1

B562P

| Comparison | A | B | C | D | E |
|---|---|---|---|---|---|
| Good | 0 | 0 | 0 | 0 | 0 |
| Fair | 0 | 0 | 0 | 0 | 0 |
| Bad | 0 | 0 | 0 | 0 | 0 |
| Total | 0 | 0 | 0 | 0 | 0 |
| Last Part | | | | | |

G532M

| Comparison | A | B | C | D | E |
|---|---|---|---|---|---|
| Good | 0 | 16 | 3 | 32 | 17 |
| Fair | 6 | 2 | 11 | 2 | 1 |
| Bad | 11 | 16 | 3 | 0 | 16 |
| Total | 17 | 34 | 17 | 34 | 34 |
| Last Part | 5J6RE3H72 AL042093 | 19889931 | 5J6RE3H72 AL042093 | 19889931 | 19889931 |

NH700M

| Comparison | A | B | C | D | E |
|---|---|---|---|---|---|
| Good | 16 | 0 | 16 | 60 | 38 |
| Fair | 0 | 60 | 0 | 0 | 14 |
| Bad | 0 | 0 | 0 | 0 | 8 |
| Total | 16 | 60 | 16 | 60 | 60 |
| Last Part | 5J6RE3H76 AL042162 | 19889412 | 5J6RE3H76 AL042162 | 19889412 | 19889412 |

NH731P

| Comparison | A | B | C | D | E |
|---|---|---|---|---|---|
| Good | 11 | 80 | 11 | 91 | 91 |
| Fair | 0 | 12 | 0 | 0 | 1 |
| Bad | 0 | 3 | 0 | 4 | 3 |
| Total | 11 | 95 | 11 | 95 | 95 |
| Last Part | 5J6RE3H73 AL042121 | 19889343 | 5J6RE3H73 AL042121 | 19889343 | 19889343 |

YR578M

| Comparison | A | B | C | D | E |
|---|---|---|---|---|---|
| Good | 0 | 0 | 2 | 0 | 0 |
| Fair | 0 | 0 | 3 | 0 | 0 |
| Bad | 5 | 0 | 0 | 0 | 0 |
| Total | 5 | 0 | 5 | 0 | 0 |
| Last Part | 5J6RE3H75 AL042136 | | 5J6RE3H75 AL042136 | | |

YR579M

| Comparison | A | B | C | D | E |
|---|---|---|---|---|---|
| Good | 0 | 0 | 0 | 0 | 0 |
| Fair | 0 | 0 | 0 | 0 | 0 |
| Bad | 0 | 0 | 0 | 0 | 0 |
| Total | 0 | 0 | 0 | 0 | 0 |
| Last Part | | | | | |

FIG-12B2

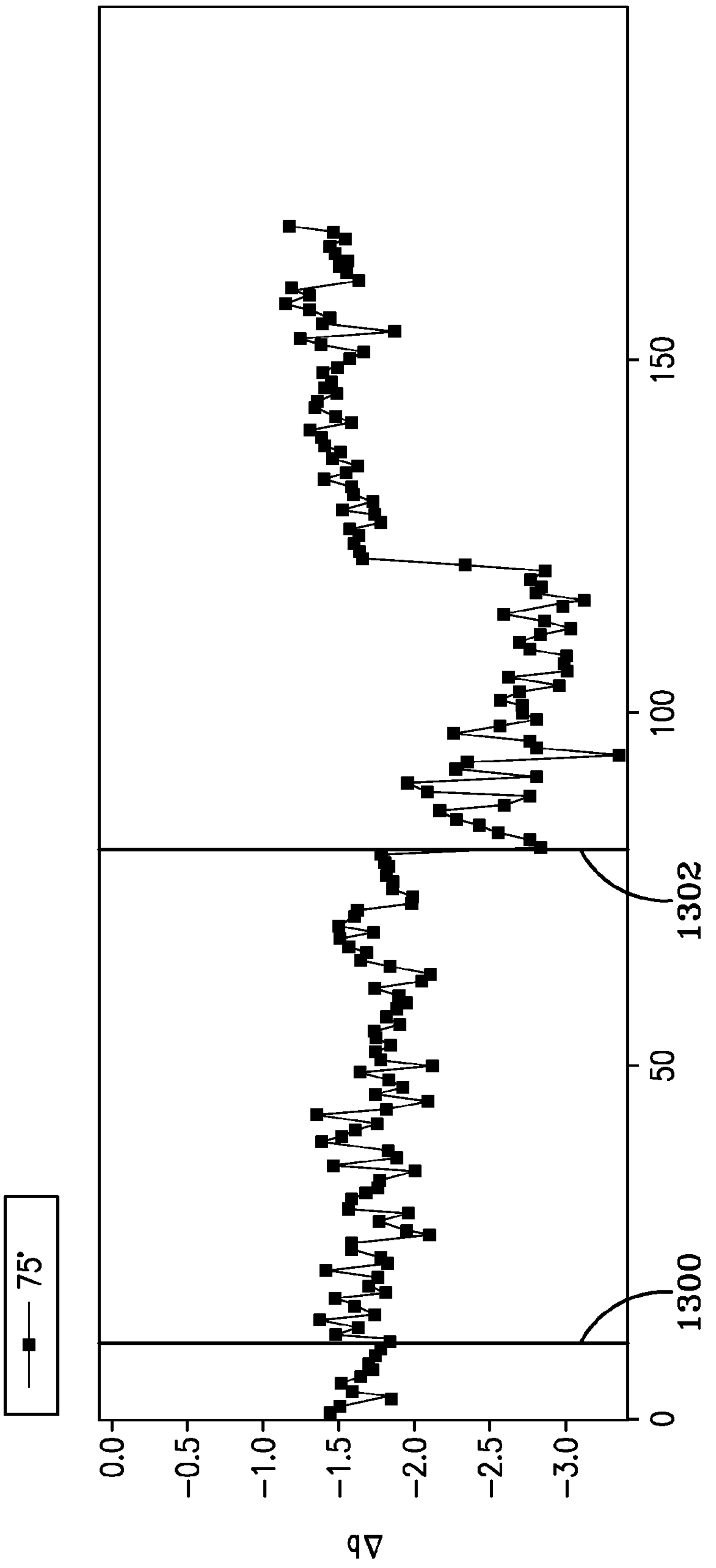
FIG−13A

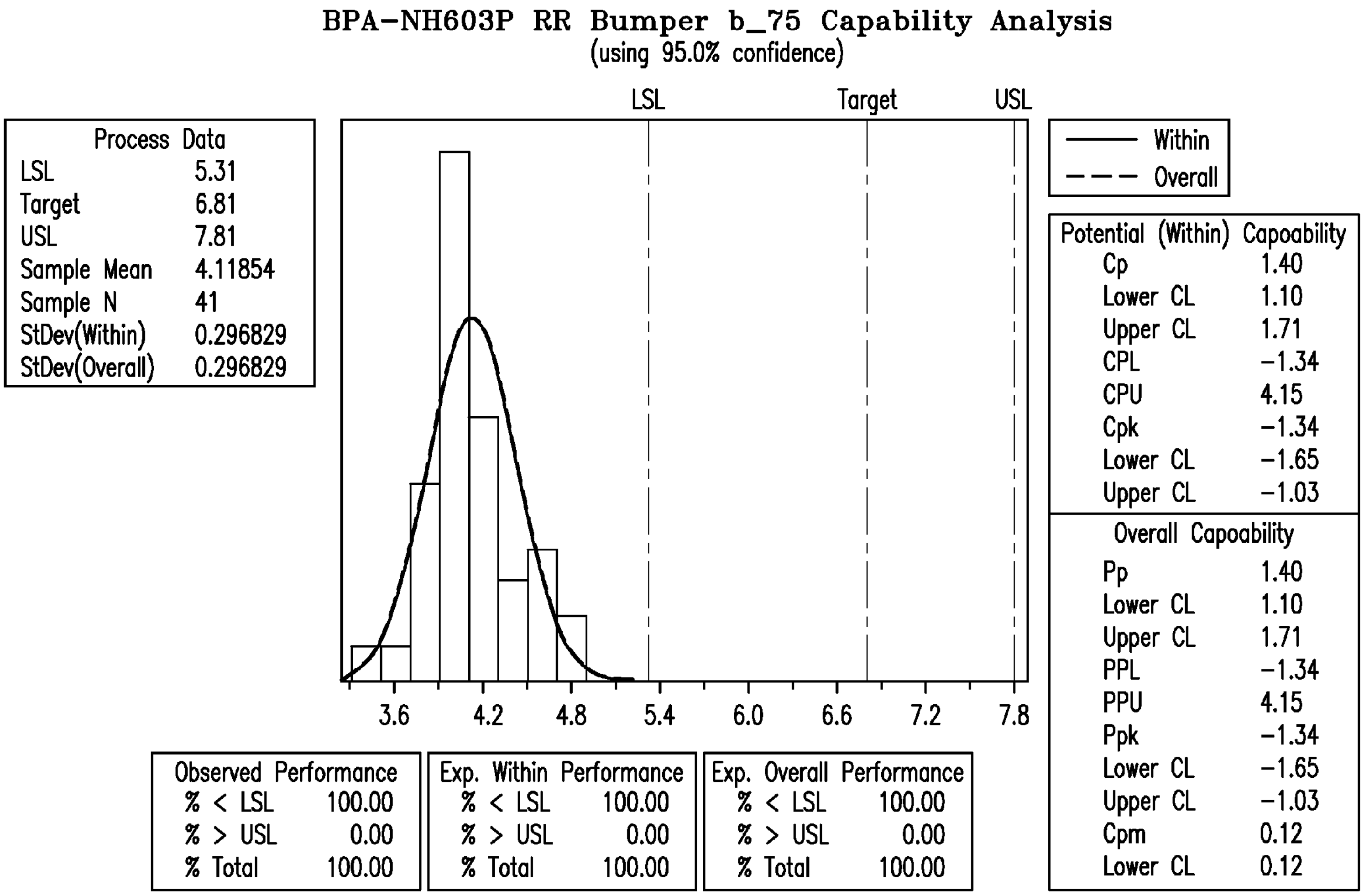
FIG−13C

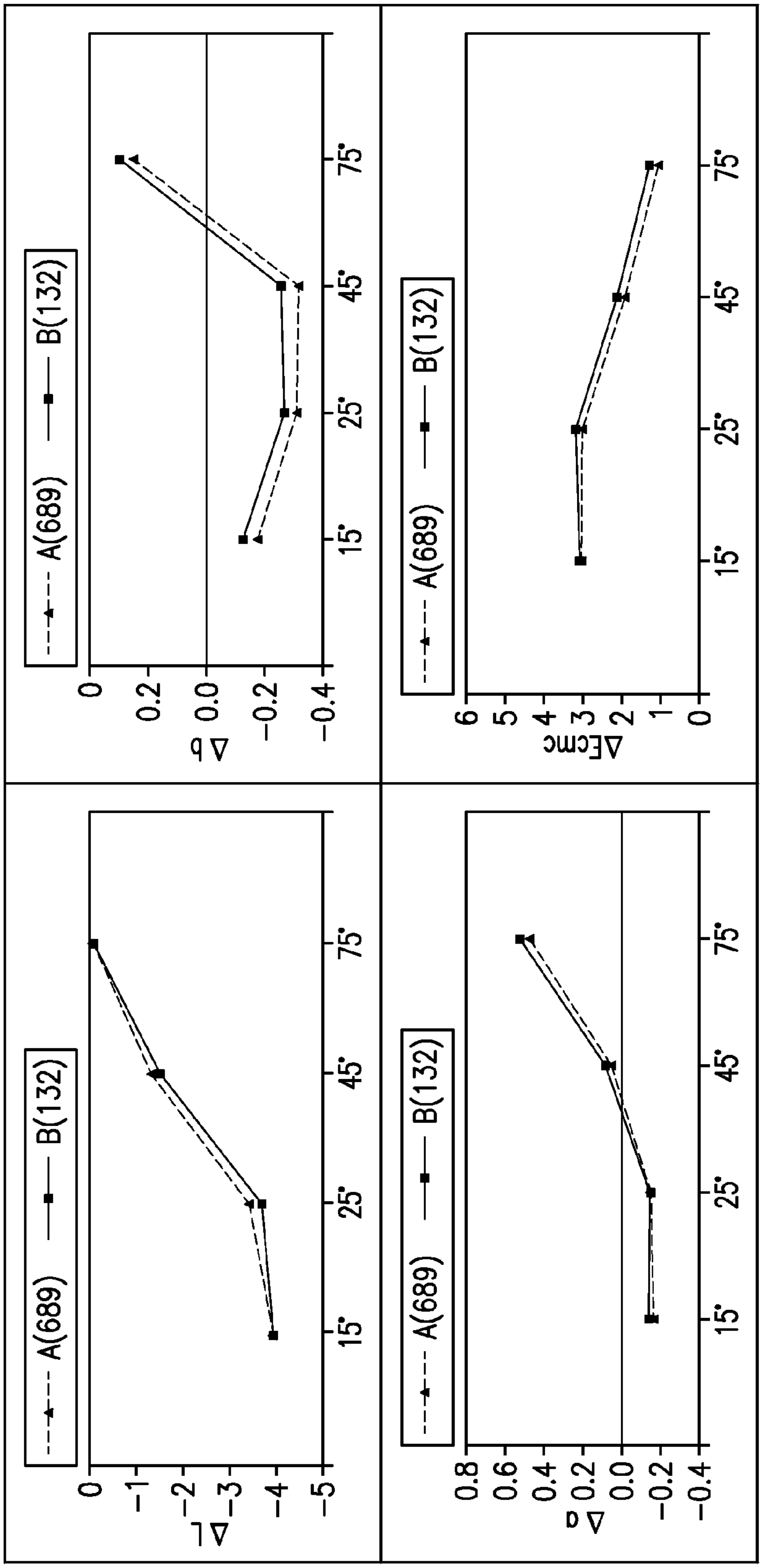
FIG−13F

Trend | Profile | Process

Filter Equip: ELP->Body Paint Loc: Body Refresh
Data Color: NH578 Model: All
Clear Start Time: 7/13/2010 1:24:04 PM End Time: 7/20/2010 1:24:04 PM

| (657) | 15° | 25° | 45° | 75° |
|---|---|---|---|---|
| L | 92.052 | 91.979 | 92.078 | 92.719 |
| a | −1.505 | −1.534 | −1.447 | −1.485 |
| b | 3.965 | 3.853 | 3.640 | 2.631 |
| C | 4.243 | 4.148 | 3.918 | 3.023 |
| H | 110.938 | 111.858 | 111.842 | 119.604 |
| ΔL | 0.552 | 0.549 | 0.668 | 0.889 |
| Δa | 0.195 | 0.196 | 0.203 | 0.195 |
| Δb | 0.045 | 0.093 | 0.080 | 0.021 |
| ΔEcmc | 0.692 | 0.706 | 0.786 | 0.891 |

Trend | Profile | Process

Filter Equip: ELP->Bumper Paint Loc: Multiple Refresh
Data Color: NH578 Model: All
Clear Start Time: 7/13/2010 1:24:04 PM End Time: 7/20/2010 1:24:04 PM

| (645) | 15° | 25° | 45° | 75° |
|---|---|---|---|---|
| L | 92.744 | 92.739 | 92.779 | 93.342 |
| a | −1.519 | −1.542 | −1.445 | −1.410 |
| b | 3.607 | 3.479 | 3.194 | 2.273 |
| C | 3.919 | 3.812 | 3.512 | 2.685 |
| H | 113.022 | 114.104 | 114.558 | 122.201 |
| ΔL | 1.244 | 1.309 | 1.369 | 1.512 |
| Δa | 0.181 | 0.188 | 0.205 | 0.270 |
| Δb | −0.313 | −0.281 | −0.366 | −0.337 |
| ΔEcmc | 1.032 | 1.064 | 1.137 | 1.244 |

FIG-14D

COLOR HARMONY WITH PROCESS AND ENVIRONMENTAL FEEDBACK

BACKGROUND

Automotive manufacturers today produce automobiles with many parts that are painted. Body parts such as doors, hoods, trunks, and various panels are painted, typically in the same color for assembly on a single vehicle. In many instances, bumpers are also painted to match the color of the body parts on the vehicle.

Painting of body and bumper parts occurs at various paint application locations throughout the automotive assembly plant. Because parts are painted at different times in different locations using different equipment and paint, variations in the color of painted parts are common. Device and equipment configurations, application techniques, paint parameters and even environmental conditions in each location where parts are painted vary over time and therefore, can affect results. Different materials are used for body (steel) and bumper (plastic) which further contributes to the difficulty of manufacturing an automobile with consistent color.

Mismatches between the colors of body parts and bumpers are typically not discerned until associates on the assembly line install the parts or bumpers on a single vehicle. Associates involved in the assembly process may notice obvious color mismatches such as a red bumper that is provided for installation on a white automobile but they may not notice subtle differences between white parts and bumpers, red parts and bumpers, etc. Even if an associate notices a color mismatch, there may be little opportunity for the associate to correct the problem during the assembly process. The associate may not have access to a substitute part. Even if another part is available, there may be no time or means to change the part. Despite the mismatch, the vehicle may progress on the assembly line to another station where the problem can be addressed by a different team of associates.

Automotive manufacturers employ various procedures for correcting color mismatches during the assembly process but correcting mismatches is more costly to the manufacturer than preventing them from occurring. Preventing color mismatches, however, is difficult. Color mismatches may not be obvious to all observers. Even if a color mismatch is obvious, associates in the assembly plant may not know which process control factors and inputs are causing the mismatches. The paint application locations can make adjustments to a variety of process control factors and inputs (e.g., device and equipment configurations, application techniques, paint mix, and other conditions) to increase the color consistency across body parts and bumpers but determining which adjustments to make and when to make them is difficult. So many variables in the paint application processes influence color consistency, it is virtually impossible to know at any point in time which variables should be adjusted. Paint application associates may be informed of a color mismatch but without additional information about the nature of the mismatch, they may be unable to make any meaningful adjustments to the paint process.

To increase color consistency on automotive body parts and bumpers, automotive manufacturers require better systems and method for detecting color mismatches and adjusting paint application processes to increase color consistency. There is a need for a computerized system and method for analyzing color consistency on automotive parts and for providing feedback on paint application processes occurring in an assembly plant. There is a need for a computerized system and method for analyzing color data across various parts and assisting an associate in determining quantitatively whether color mismatches have occurred or are likely to occur. There is a need for a computerized system and method for measuring variations in color on automotive parts and identifying process control factors may be adjusted to increase color consistency on parts.

SUMMARY

The present disclosure describes a computerized system and method for analyzing color consistency on automotive parts and for providing feedback on paint application processes occurring in an assembly plant. The computerized system and method supports quantitative monitoring of paint process variables and environmental variables that may influence color on numerous painted body parts (material=steel) and bumpers (material=plastic). The computerized system and method facilitates data collection at numerous points during paint application processes to identify trends in colors and to identify the process input factors or items that influence them. The computerized system and method supports the identification of possible adjustments to paint application processes so that all bumpers and bodies may be painted within a specified color tolerance. The computerized system and method reduces or prevents color mismatches that may be created in respective paint application locations in the assembly plant. As a result, scrap and rework is reduced or prevented.

In an example embodiment, the computerized system and method involves inspecting every body and bumper during the paint application process and storing colorimetric and measurement data in association with an identifier for the body part or bumper. Colorimetric data is captured and stored with measurement data that relates to equipment and paint mix variables as well as environmental variables that influence the paint results. The measurements associated with each part identifier (VIN or unique part number) are collected during a paint inspection process and stored with the colorimetric data. The data may then be accessed through a software application that facilitates analysis of the data and troubleshooting possible causes for color discrepancies.

In an example embodiment, the computerized system and method measures colorimetric values (L, a, b) using a commercially available device and compares variations in the data over time to the process, including environmental, variables associated with many devices in many paint application locations in the assembly plant. In an example embodiment, paint process data is collected for paint application devices, paint flow devices, and paint mix devices as well as the environmental data in the paint booths (e.g., temperature and humidity). The collected data is associated with a part identifier (VIN number for a body or unique part number for a bumper) to identify and track color changes created by paint process, including environmental, changes. Associates in paint application locations may access and view the trend changes in "real-time" in order to control the important paint process variables that influence color results. As the color on one or more parts trends away from a specified standard, an associate may make paint process or environmental changes, prior to the production of body or bumper parts that might otherwise result in a color mismatch when the parts are assembled on the same vehicle.

BRIEF DESCRIPTION OF THE DRAWINGS

FIGS. 11A-11B are sample color detail profile screens according to an example embodiment;

FIGS. 12A-12C have sample color travel analysis screens according to an example embodiment;

FIGS. 13A-13G have sample screens for completing a color study according to an example embodiment; and FIGS. 14A-14D have sample process data graphs according to an example embodiment.

DETAILED DESCRIPTION

Figure 1A:
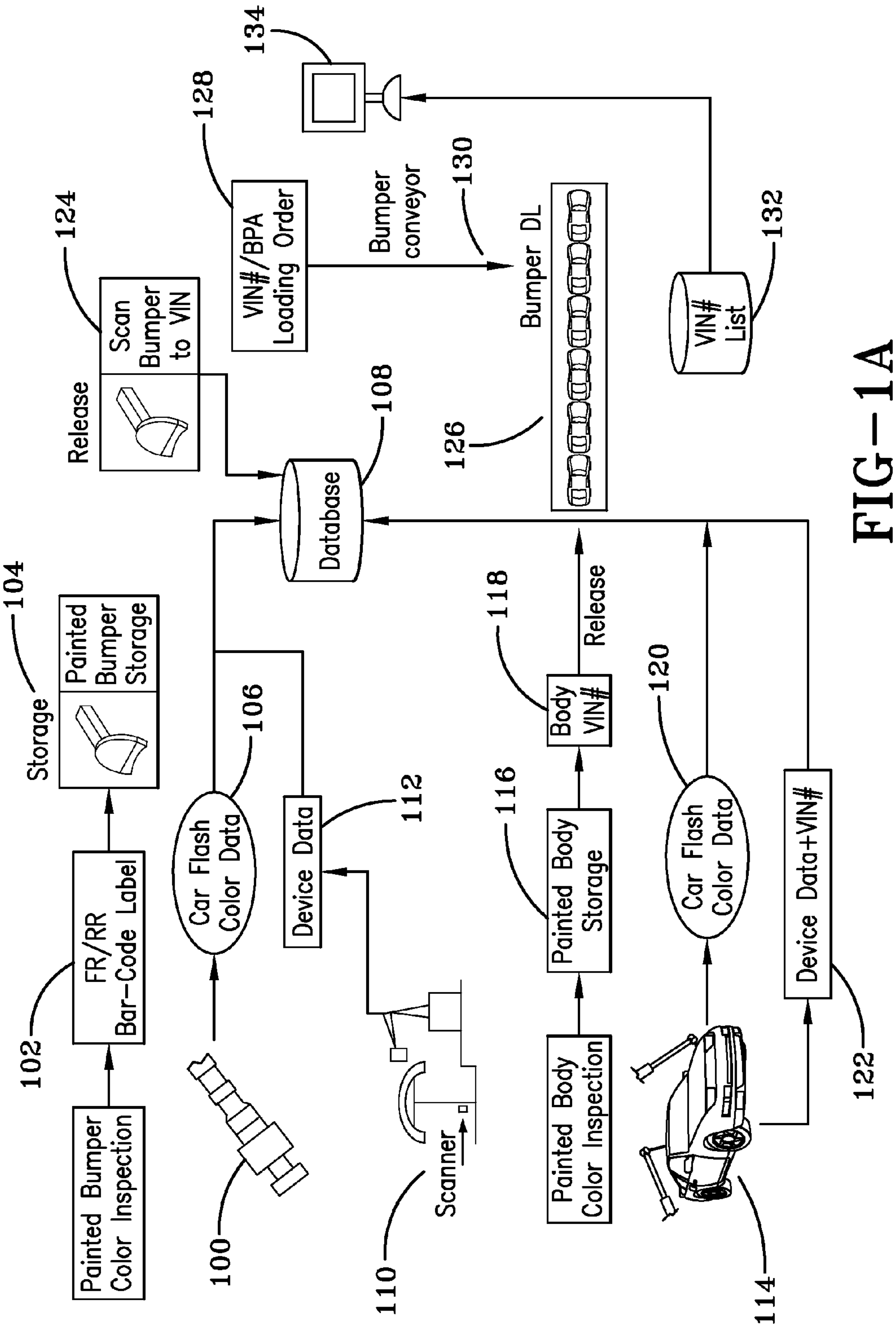
FIGS. 1A-E are diagrams illustrating various aspects of a computerized paint process monitoring and analysis system and method according to an example embodiment.

Referring to FIG. 1A, a block diagram of a computerized paint process monitoring and analysis system and method according to an example embodiment is shown. During a bumper inspection process, data for various body paint conditions is collected, associated with a bumper part identifier 102, and stored in a database 108. A colorimetric measurement device 100 captures car flash colorimetric data 106 (e.g., angle, L, a, b, chroma, and hue angle) and a scanner or other device 110 captures bumper paint condition data 112 such as material conditions (e.g., color number, lot number, turnover percentage, and tolerance), paint application conditions (e.g., gun tip liquid temperature, discharge, air pressure, gun speed, and R/B number) and drying conditions (e.g., oven temperature, air flow, and humidity). The colorimetric data 106 and process data 122 is stored in the database 108 with the bumper identifying data 102. Following the inspection process, the painted bumper is stored for use in the assembly process 104.

A similar inspection process is completed for body parts 114. Car flash colorimetric data 120 and process data 122 is captured and stored with a VIN number or other identifier for the body. Body paint conditions may include material conditions (e.g., color number, lot number, turnover percentage, and tolerance), paint application conditions (e.g., gun tip liquid temperature, discharge, air pressure, gun speed, and R/B number) and drying conditions (e.g., oven temperature and air flow). Following the inspection process, the painted body part is stored for use in the assembly process 116.

Figure 1B:
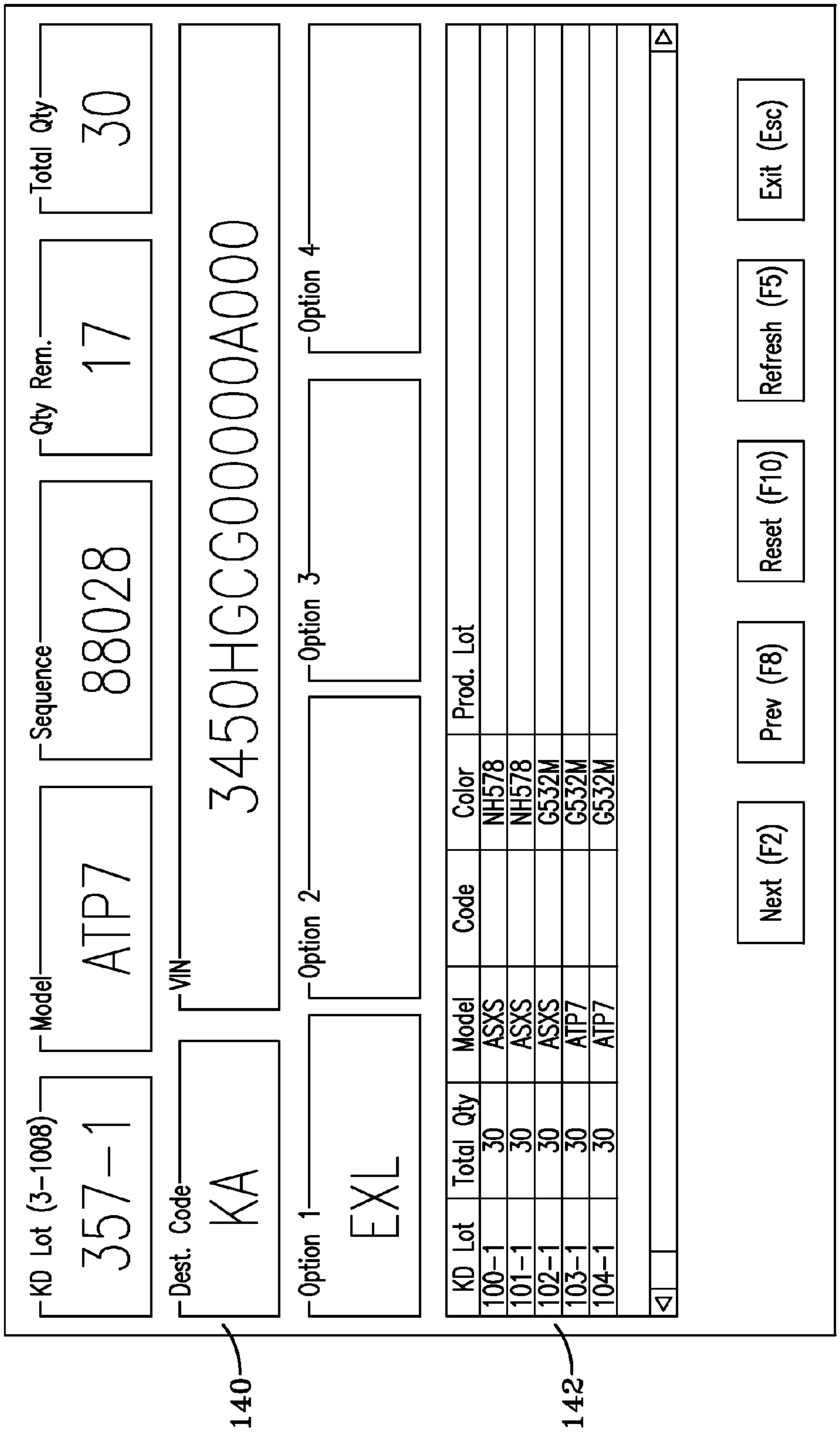

During the vehicle assembly process 126, the body 118 and bumpers are released. The bumper identifier is scanned and associated with the body identifier (VIN) 124 on which it is installed. The associates installing the bumpers on the body may follow an assembly plan that defines a VIN/bumper loading order 128 so an appropriately colored bumper is available for the assembly process 130. Once the bumper and body part identifiers are linked through the VIN, the colorimetric and process data associated with each body part and bumper is accessible through the VIN 132. The colorimetric and paint process condition data for each linked body part and bumper facilitates the detection and diagnosis of color problems. Referring to FIG. 1B, a sample display from a line control application is shown. The line control application provides associates with production details for a current vehicle 140 and indicates a color order in a production sequence 142 to facilitate the assembly of painted body parts and bumpers.

Time data (e.g., a timestamp) associated with each data capture may be stored with the colorimetric and device data to facilitate analysis of data over time. In an example embodiment, the data may be exported to a software application that facilitates access to measurement data for monitoring, analysis, and output. In an example embodiment, monitoring features support selection of current or past data to view color variations of one or more parts, compare basic production conditions to known standards, and issue alarms when conditions exceed specified standards or tolerances. The monitoring features may allow an associate to select evaluation items, paint factors, and data ranges.

Figure 1C:
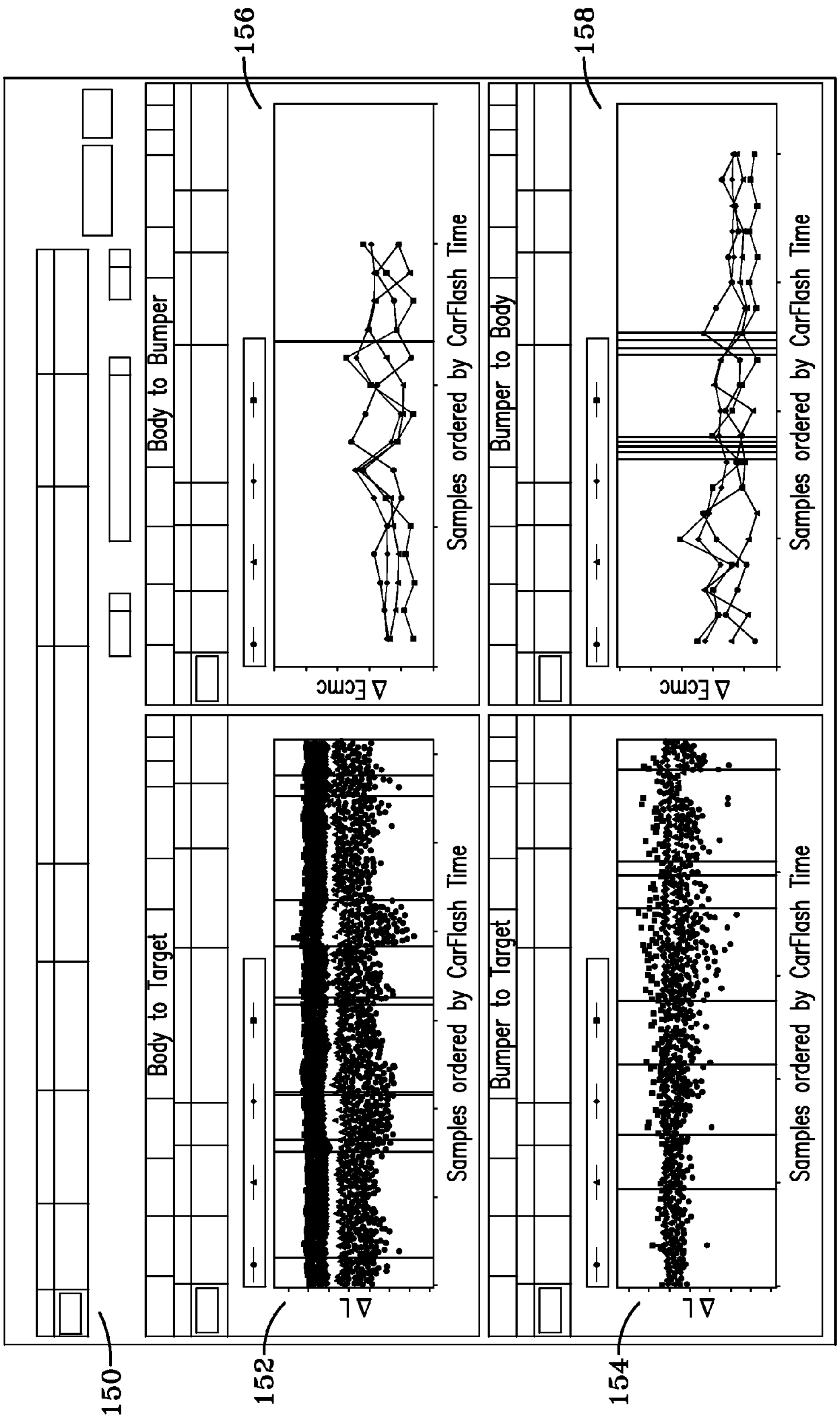
Figure 1D:
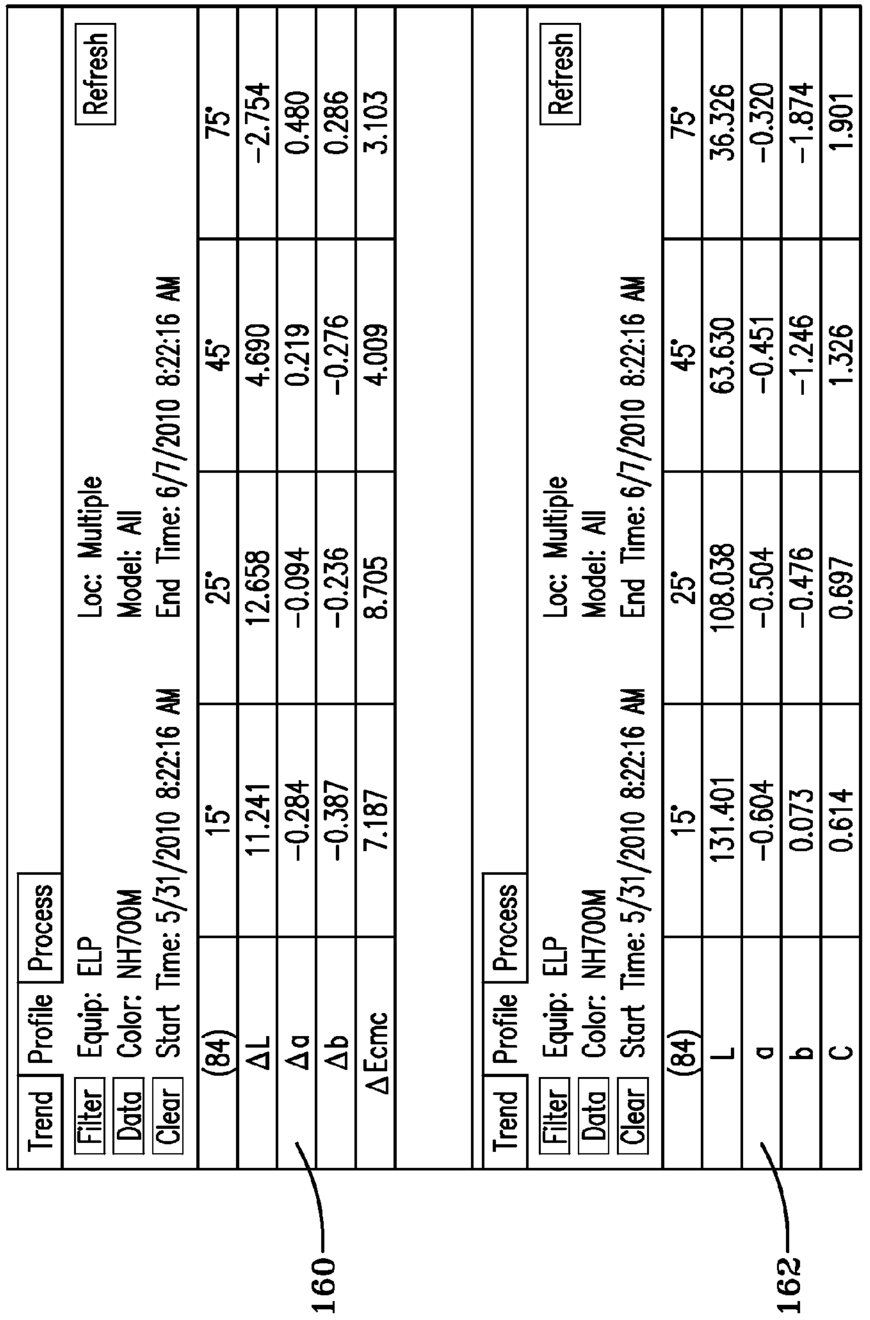

Referring to FIG. 1C, a sample color monitoring display according to an example embodiment is shown. Data selection and layout options 150 allow an associate to view different measurements simultaneously. In the sample display, each data sample is ordered by car flash time. A first display 152 shows ΔE for each body in relation to a standard. A second display 154 shows ΔE for each bumper in relation to a standard. A third display 156 show ΔEcmc for each body to installed bumper while the fourth display 158 shows ΔEcmc for each installed bumper to body. The displays show color trends as well as indicate whether certain values are within expected ranges. Referring to FIG. 1D, a sample profile view of colorimetric data is shown. The associate may select inputs to view ΔL, Δa, Δb, and calculated ΔEcmc values 160 as well as L, A, b, and C values 162.

Figure 1E:
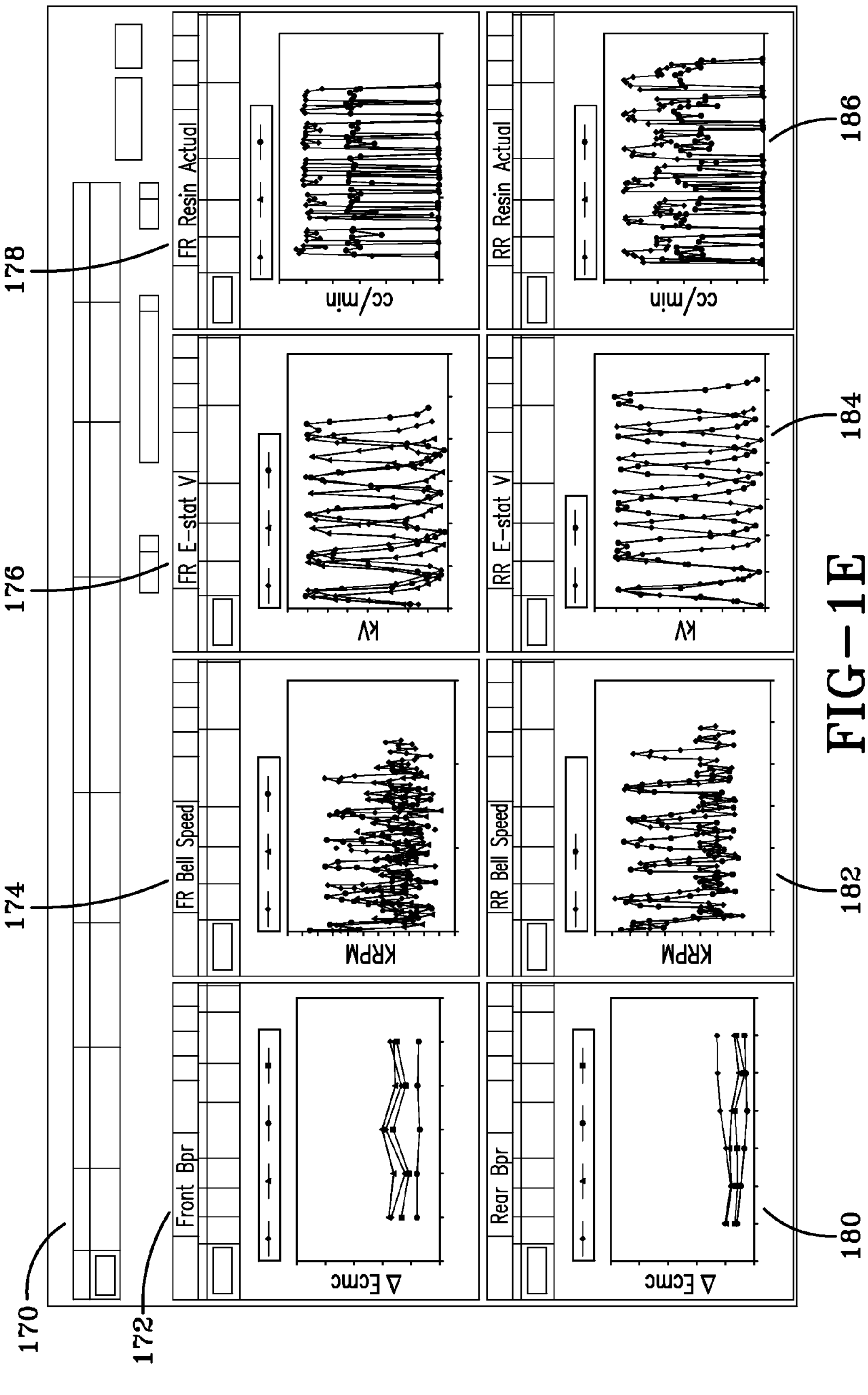

Referring to FIG. 1E, a sample bumper color and process condition data display according to an example embodiment is shown. As indicated in the sample display, an associate can select inputs 170 to view data related to color measurements and representative robot control parameters (e.g., front bumper base coat robot L2, L3, L4 process data or rear bumper base coat robot R2, R3, R4 process data).

TABLE 1

| Color Measurements and Representative Robot Control Parameters | |
|---|---|
| 172 | Front Bumper ΔEcmc |
| 174 | Bell RPM 24~27 KRPM |
| 176 | E-stat Voltage 70 KV |
| 178 | Actual Resin Flow (cc/min) |
| 180 | Rear Bumper ΔEcmc |
| 182 | Bell RPM 24~27 KRPM |
| 184 | E-stat Voltage 70 KV |
| 186 | Actual Resin Flow (cc/min) |

The ability to view the colorimetric data in relation to the paint process control parameters facilitates the detection and correction of equipment or environmental problems that are influencing the results. An associate may view a variety of input or control factors to identify a possible cause for a change in a color trend.

When color data exceeds specified standards or tolerances or otherwise appears abnormal, an associate may invoke analysis features in the software application to identify a possible cause. Analysis features include selection of an analysis method (e.g., process capability, ANOVA, design of experiment) as well as selection of evaluation items (e.g., L, a, b at 25 degrees, ΔE25, Lw, and surface temperature), selection of factors (e.g., bell RPM, gun tip liquid temperature, discharge, and booth temperature), and selection of ranges (e.g., time-time, color-color, and part identifier-part identifier). The ability to analyze the data in a variety of ways facilitates the troubleshooting process and identification of possible causes for a color consistency problem. Output features allow the associate to select items to output (e.g., export data to statistical analysis package, generate graphic output of selected files for selected ranges) and to display, print, or save output.

Figure 2:
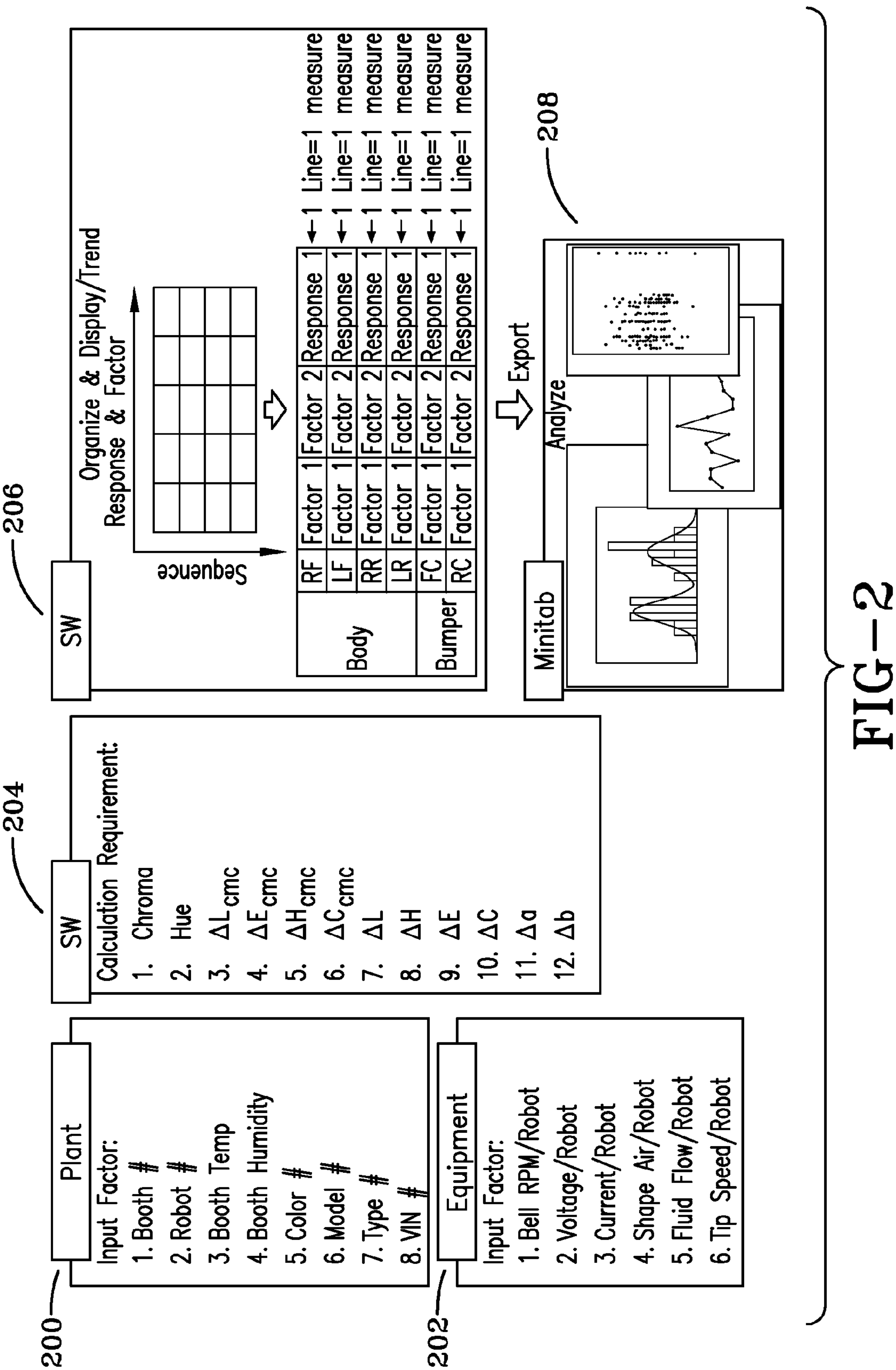
FIG. 2 is a block diagram of inputs and calculation requirements for a computerized paint process monitoring and analysis system and method according to an example embodiment.

Referring to FIG. 2, a block diagram of inputs and calculation requirements for a computerized paint process monitoring and analysis system and method according to an example embodiment is shown. Input factors relating to the plant environment 200 may include booth number, robot number, booth temperature, booth humidity, color number, model number, type number, and VIN or part identifier. Input factors relating to equipment 202 may include bell RPM, voltage, current, shape air, fluid flow, and tip speed. Calculation requirements for output 204 may include chroma, hue, and various difference measurements. A software application of the computerized system and method facilitates organization and display of data 206 and facilitates export of data to statistical analysis and graphing packages 208.

Figure 3A:
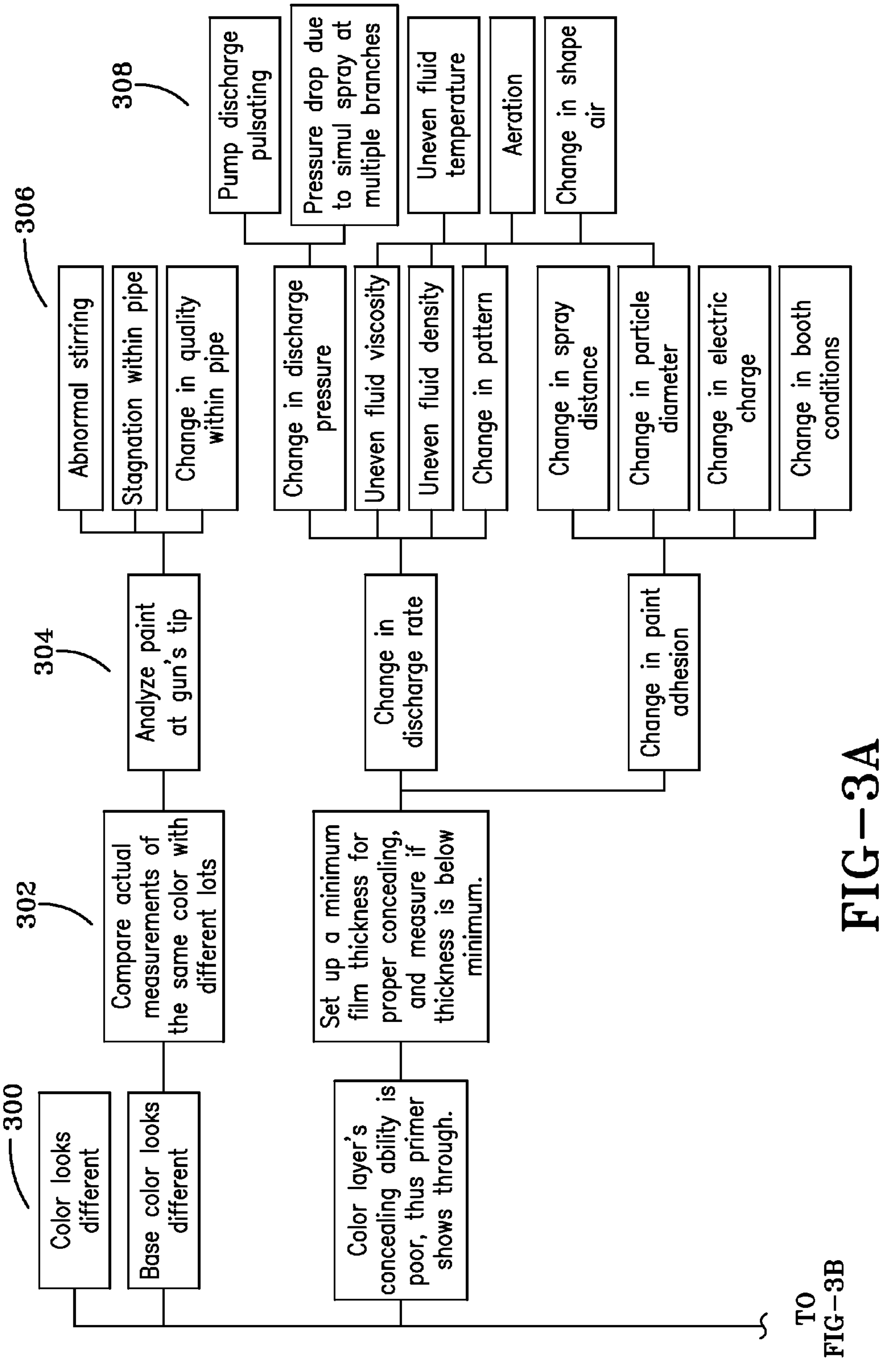
FIGS. 3A and 3B are a block diagram for a troubleshooting color problem scheme according to an example embodiment.
Figure 3B:
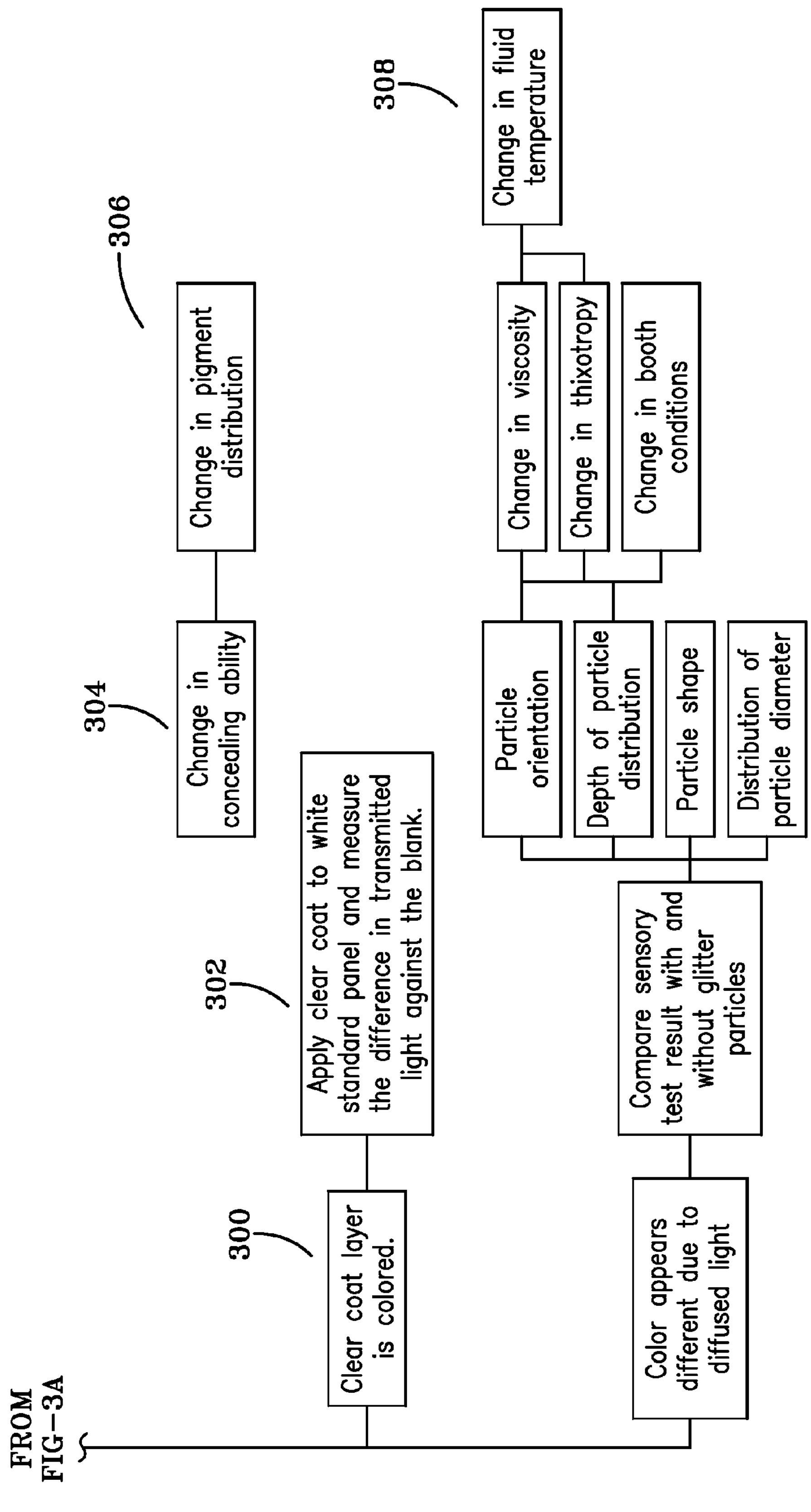

Referring to FIGS. 3A and 3B, a block diagram for a troubleshooting color problem scheme according to an example embodiment is shown. Variations and anomalies in color data for one or more parts 300 may be indicative of problems in equipment or environmental conditions. For example, a visual inspection may indicate base colors that look different, a color layer that does not conceal as expected and allows primer to show through, or a color that appears different in diffused light. Depending on the color problem that has been detected, an associate may perform additional tasks 302 to analyze data related to the color problem and to determine a corrective action. A task 302 may comprise additional sub-tasks 304, 306 that lead to identification of the color consistency cause 308 and toward a corrective action.

Figure 4:
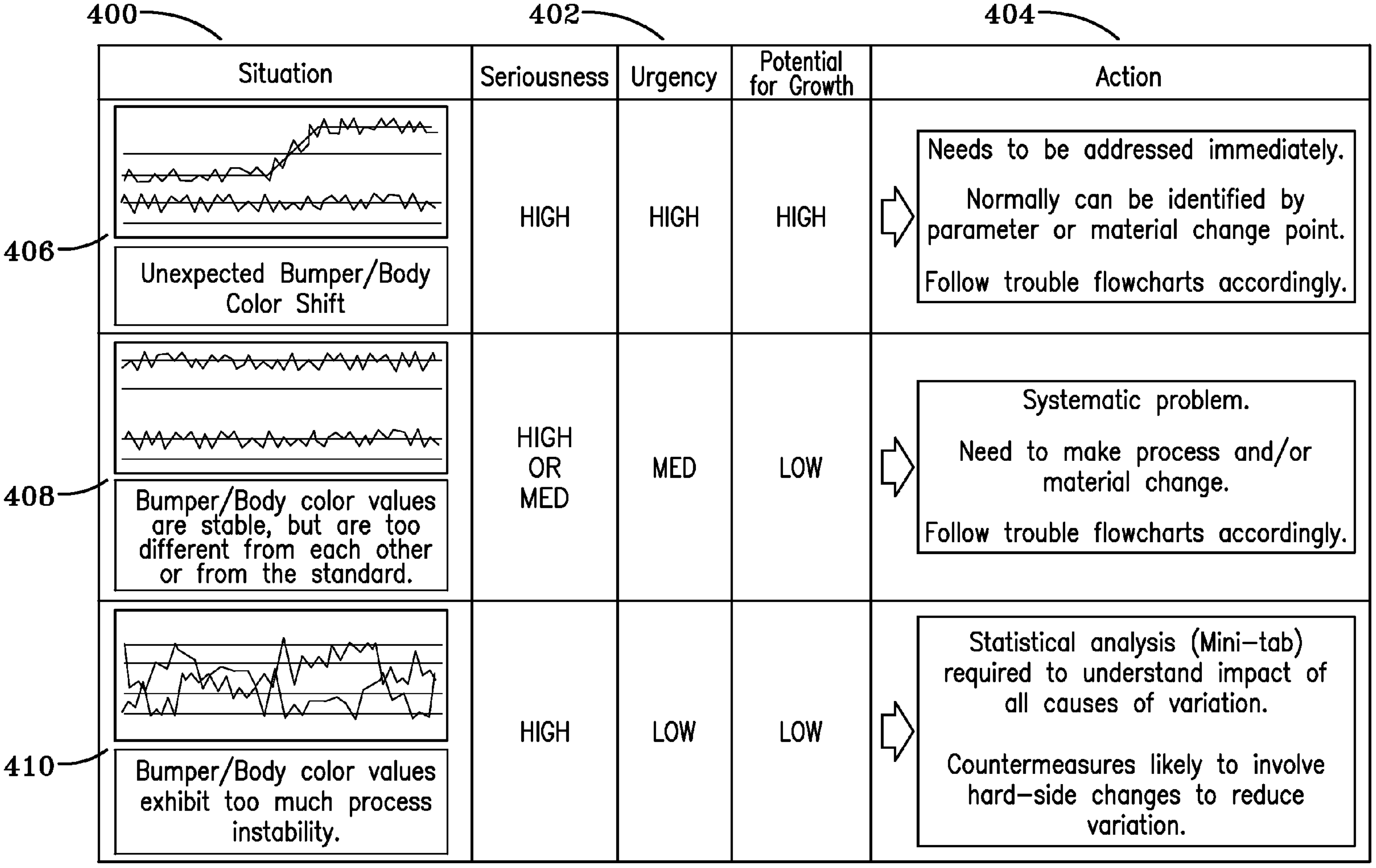
FIG. 4 is an action map according to an example embodiment.

Referring to FIG. 4, an action map according to an example embodiment is shown. In an example embodiment, the action map comprises situation details 400, priority rankings 402, and suggested actions 404. As illustrated in FIG. 4, a graph of colorimetric data for a bumper and body part 406 may indicate a color shift on certain parts over a specified period of time. The color shift is a serious problem that requires an associate's immediate attention. Another graph of colorimetric data 408 may indicate stable color values but deviations from the standard that are too high. This type of problem reflects a systematic problem that requires an associate's attention but may not need to be addressed immediately. Finally, another graph of colorimetric data 410 may indicate instability in the paint process. An associate may deploy various analysis techniques to identify a source for the problem and countermeasures that may be taken to correct the problem.

Figure 5A:
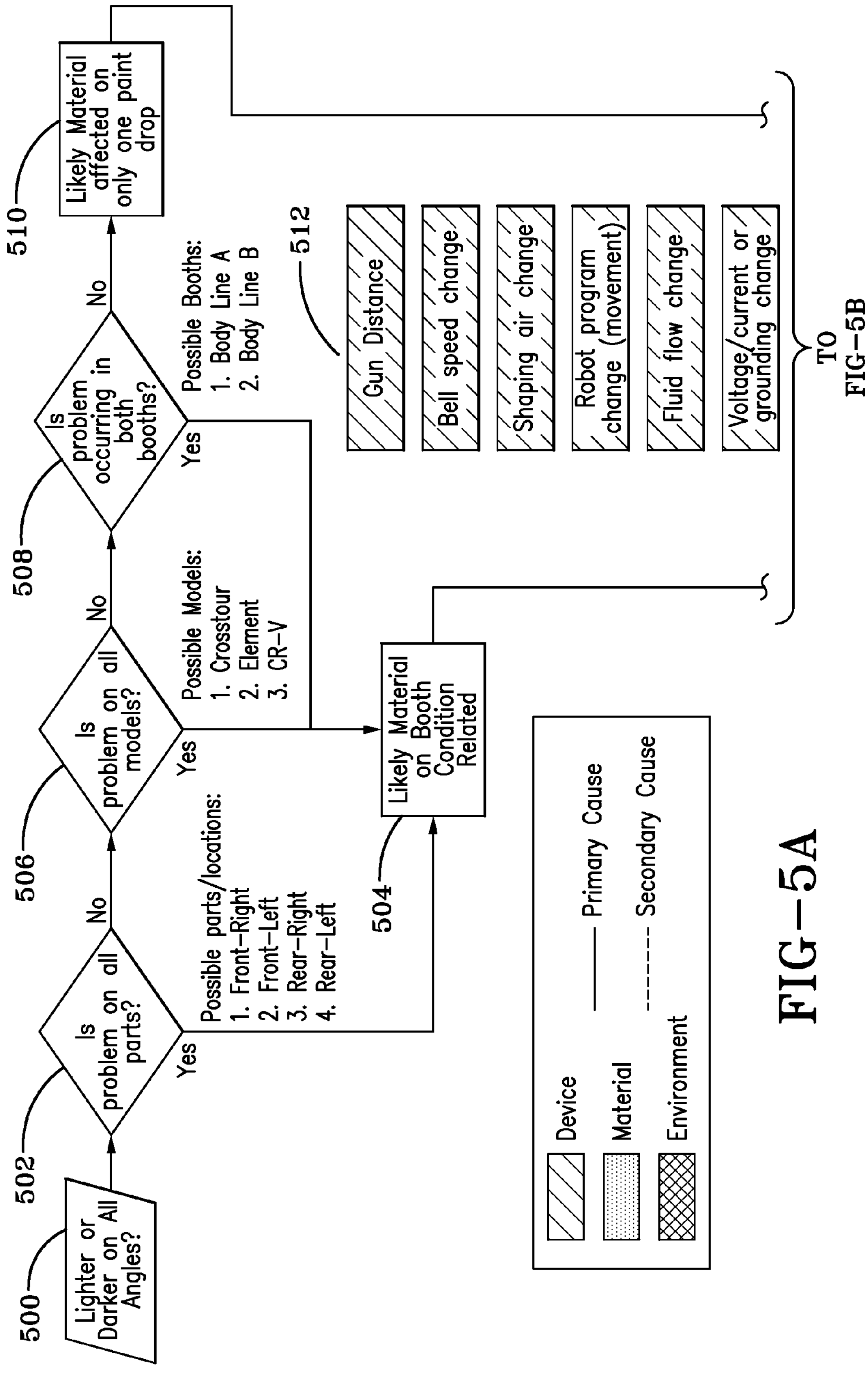
FIGS. 5A and 5B are a troubleshooting flow diagram according to an example embodiment.
Figure 5B:
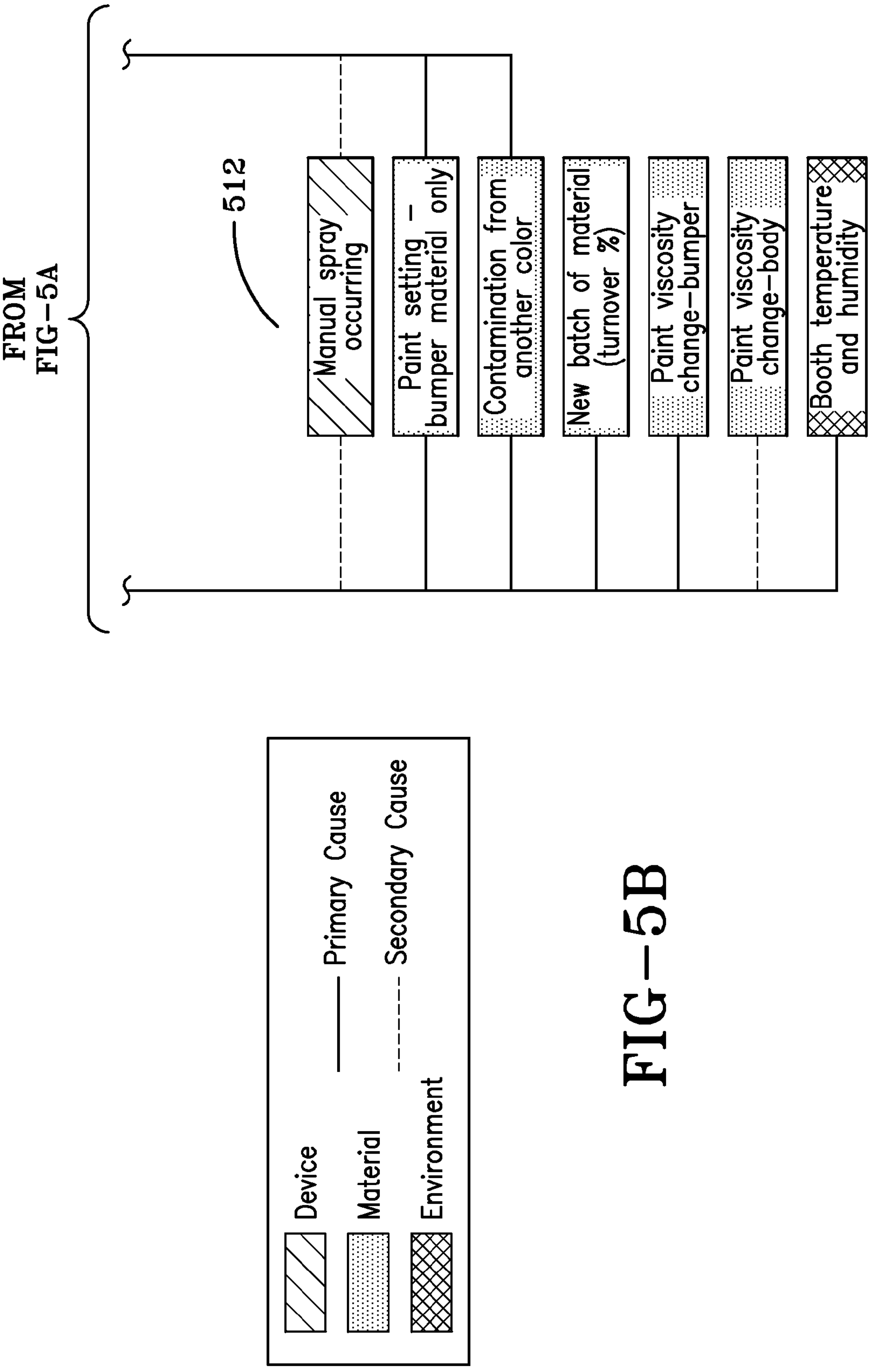

Referring to FIGS. 5A and 5B, a troubleshooting flow diagram according to an example embodiment is shown. The troubleshooting flow diagram may relate to a specific color consistency problem 500 (e.g., paint is lighter or darker on all angles). The flow diagram (and related software logic) presents additional questions for the associate to consider (e.g., problem is on all parts 502, problem is on all models 506, problem occurring in both booths 508). Depending on the associate's answer to the questions, the flow diagram leads to a conclusion (e.g., likely material or both condition related 504, likely material affected only on one paint drop 510). Depending on the applicable conclusion, the flow diagram further identifies one or more potential causes of the color consistency problem. Causes may be classified as "device/equipment," "material," or "environment." The flow diagram may further provide details about possible causes for the associate to consider 512 in troubleshooting the problem. The cause details assist the associate in taking corrective actions or countermeasures. Similar types of troubleshooting flow diagrams may be developed for other color consistency problems such as changes in hue or chroma, L travel changes, etc.

Figure 6:
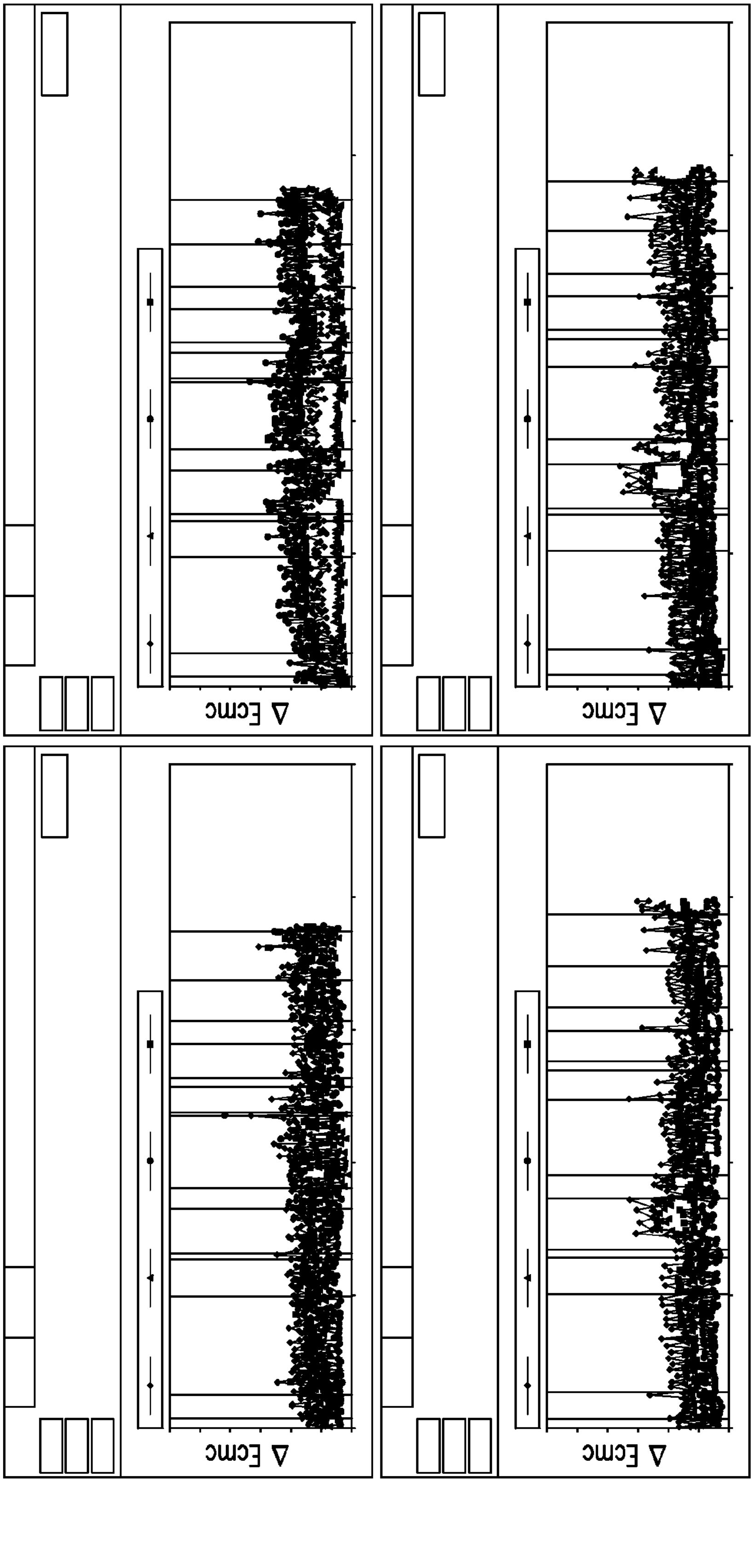
FIG. 6 has sample graphs showing color shifts and color trends over time for an example embodiment.
Figure 7:
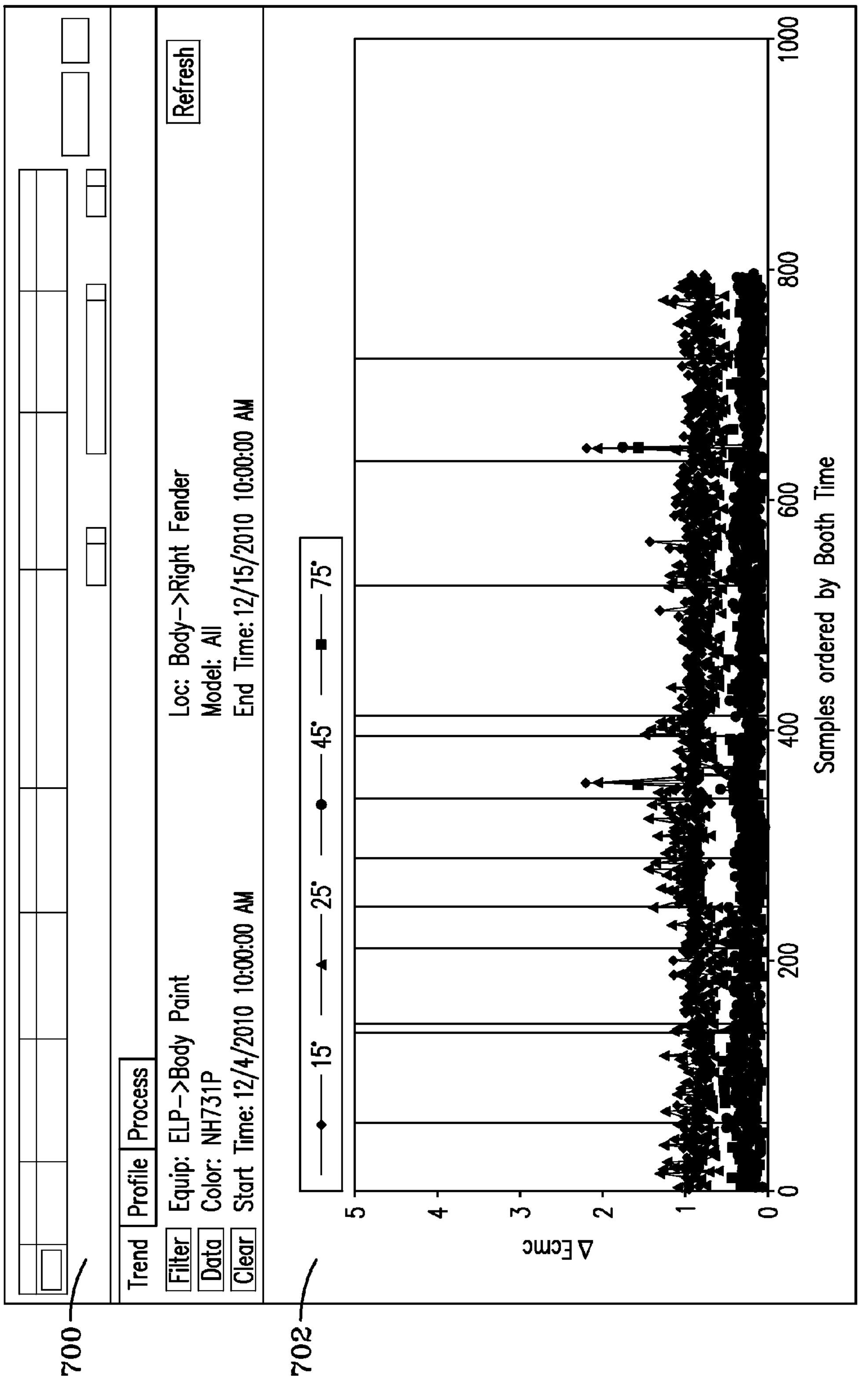
FIG. 7 is a sample enlarged color shift graph according to an example embodiment.

Referring to FIG. 6, sample graphs showing color shifts and color trends over time for an example embodiment are shown. As shown in FIG. 6, an associate interacting with the computerized color monitoring software application may view color data across multiple parts and see when color shifts for various parts occur. Referring to FIG. 7, a sample enlarged color shift graph according to an example embodiment is shown. An associate may specify selection criteria 700 and view a corresponding graph. In the example, the ΔEcmc measure ordered by booth time is shown.

Figure 8:
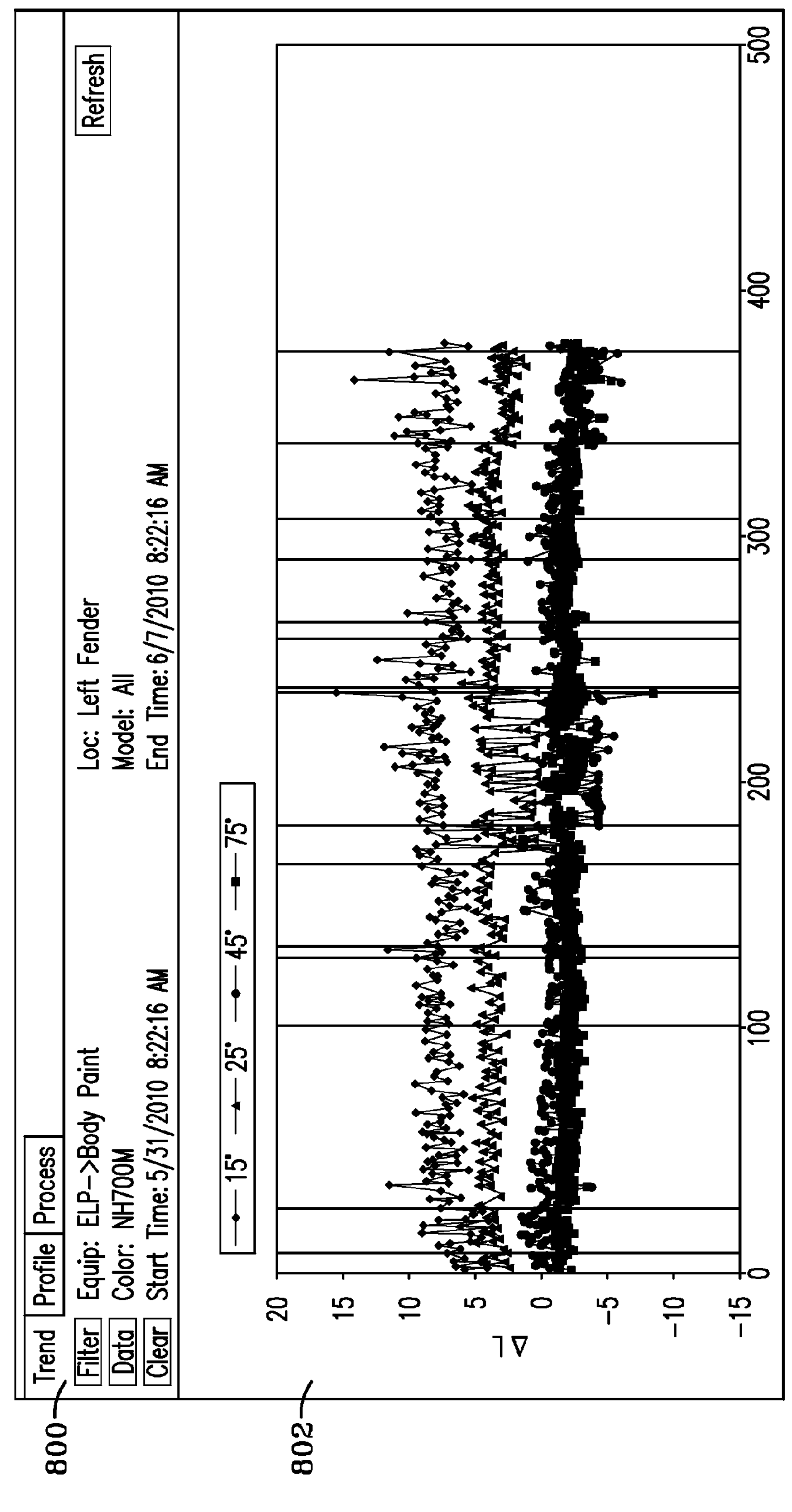
FIG. 8 is a sample graph displaying ΔL data over time according to an example embodiment.

Referring to FIG. 8, a sample graph displaying ΔL data over time according to an example embodiment is shown. This type of graph assists an associate in determining whether a color problem is present on more than one part or more than one model. An associate may specify selection criteria 800 and view a corresponding graph.

Table 2 provides troubleshooting details organized according to device/equipment causes, material causes, and environmental causes. For each cause, suggested countermeasures or corrective actions are identified.

TABLE 2

| Troubleshooting Flow | | |
|---|---|---|
| Monitored Parameter (Cause) | How to Check | |
| Device/Equipment | | |
| Paint Settling - Bumper Only | Check Circulation Flow Rates | Check Closed Valve or Blockage on Paint Return Line(s) |
| Contamination from Another Color | Compare Part to Pre-ship Panel | Compare Sample from System to Sample from Drum or Tote |
| New Batch of Material (turnover %) | Paint Tracking database | Paint Mix Records |
| Paint Viscosity Change - Bumper | Paint Tracking Database | Paint Mix Records |
| Paint Viscosity Change - Body | Paint Tracking Database | Paint Mix Records |
| Material | | |
| Gun Distance | Robot Change History | |
| Bell Speed Change | Paint Tracking Database | Robot Change History |

TABLE 2-continued

| Troubleshooting Flow | | |
|---|---|---|
| Monitored Parameter (Cause) | How to Check | |
| Shaping Air Change | Paint Tracking Database | Robot Change History |
| Robot Program Change (Movement) | Paint Tracking Database | Robot Change History |
| Fluid Flow Change | Paint Tracking Database | Robot Change History |
| Voltage/Electric Current Change | Paint Tracking Database | Robot Change History |
| Manual Spray Occurring | At the Spot Check | |
| | Environment | |
| Booth Temperature and Humidity | Paint Tracking database | Plantscape History |

Figure 9:
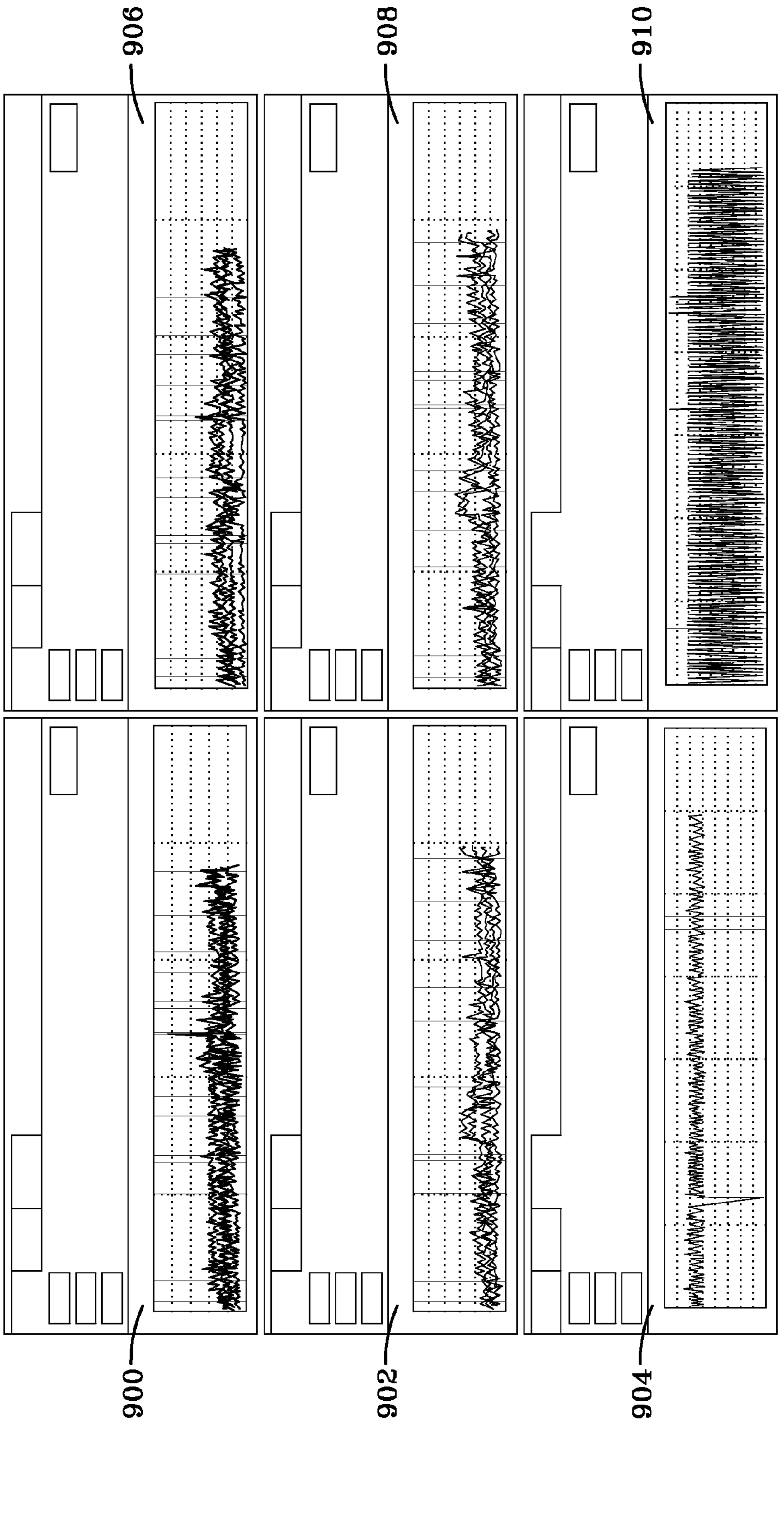
FIG. 9 has sample graphs that facilitate troubleshooting according to an example embodiment.

Referring to FIG. 9, sample graphs that facilitate troubleshooting according to an example embodiment are shown. As indicated in FIG. 9, an associate may view graphs displaying color data over time for a selected part 900, 902, 906, 908 or for a selected paint over time (e.g., bumper paint) 904, 910.

Figure 10A:
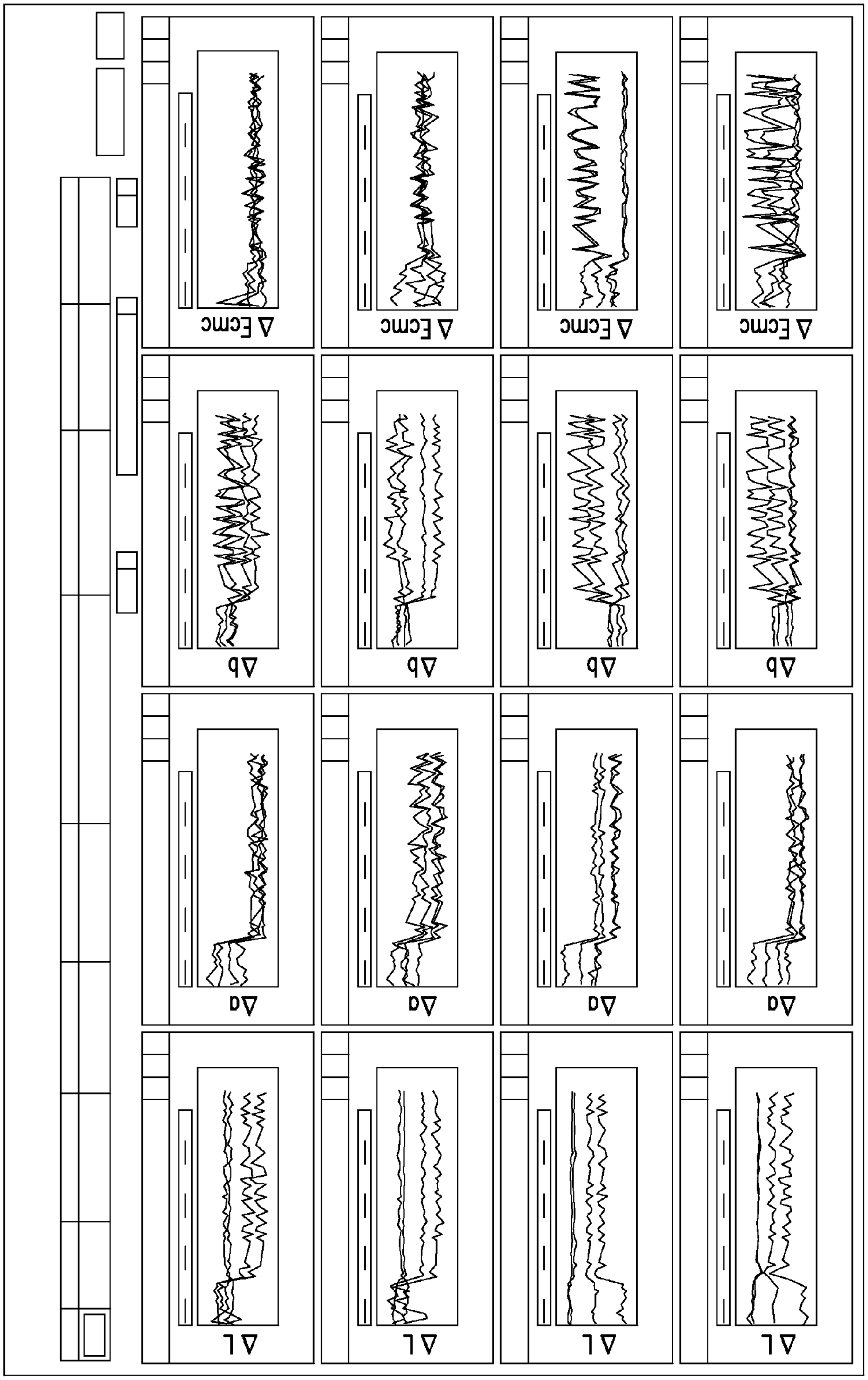
FIGS. 10A-10D have sample graphs of color trend data according to an example embodiment.
Figure 10B:
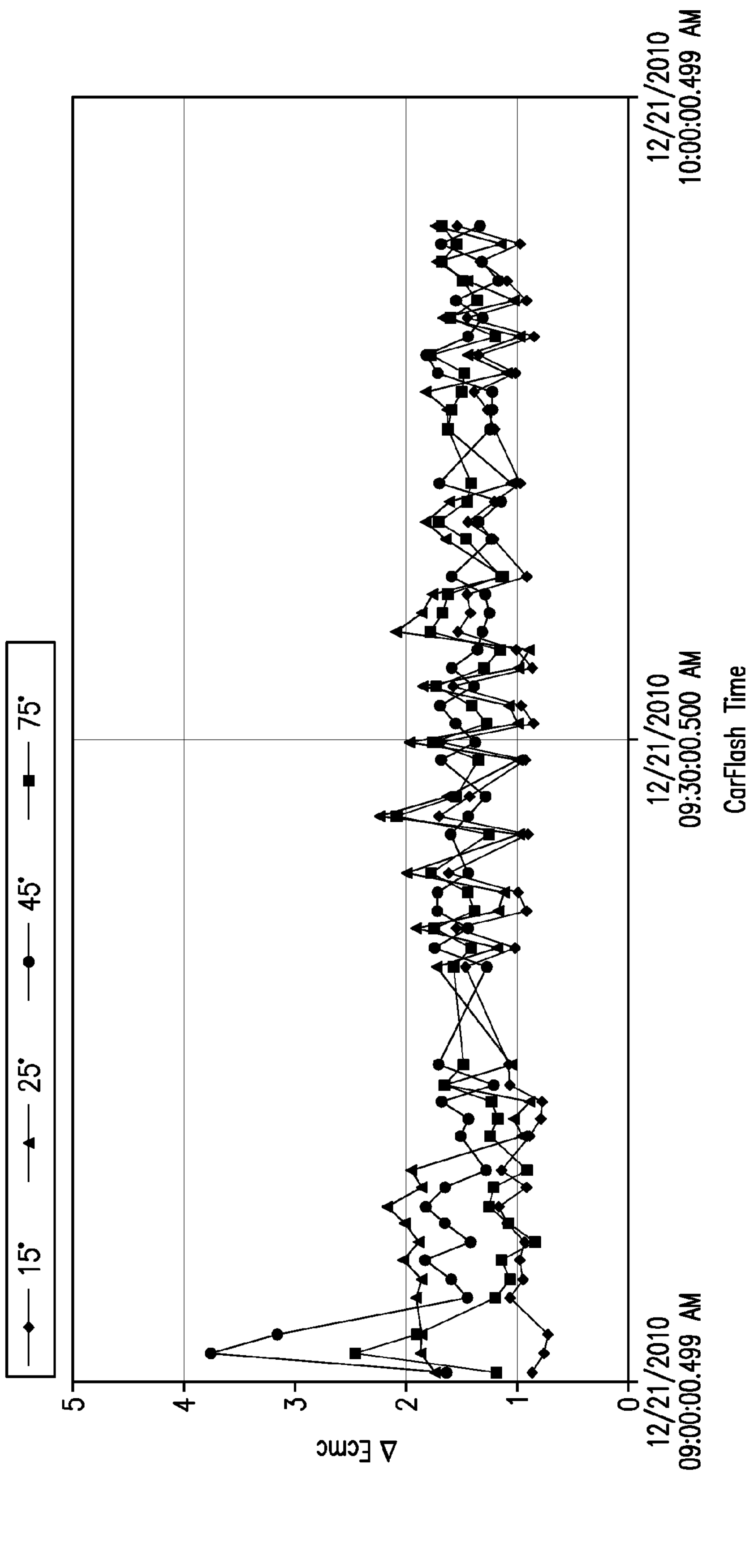
Figure 10C:
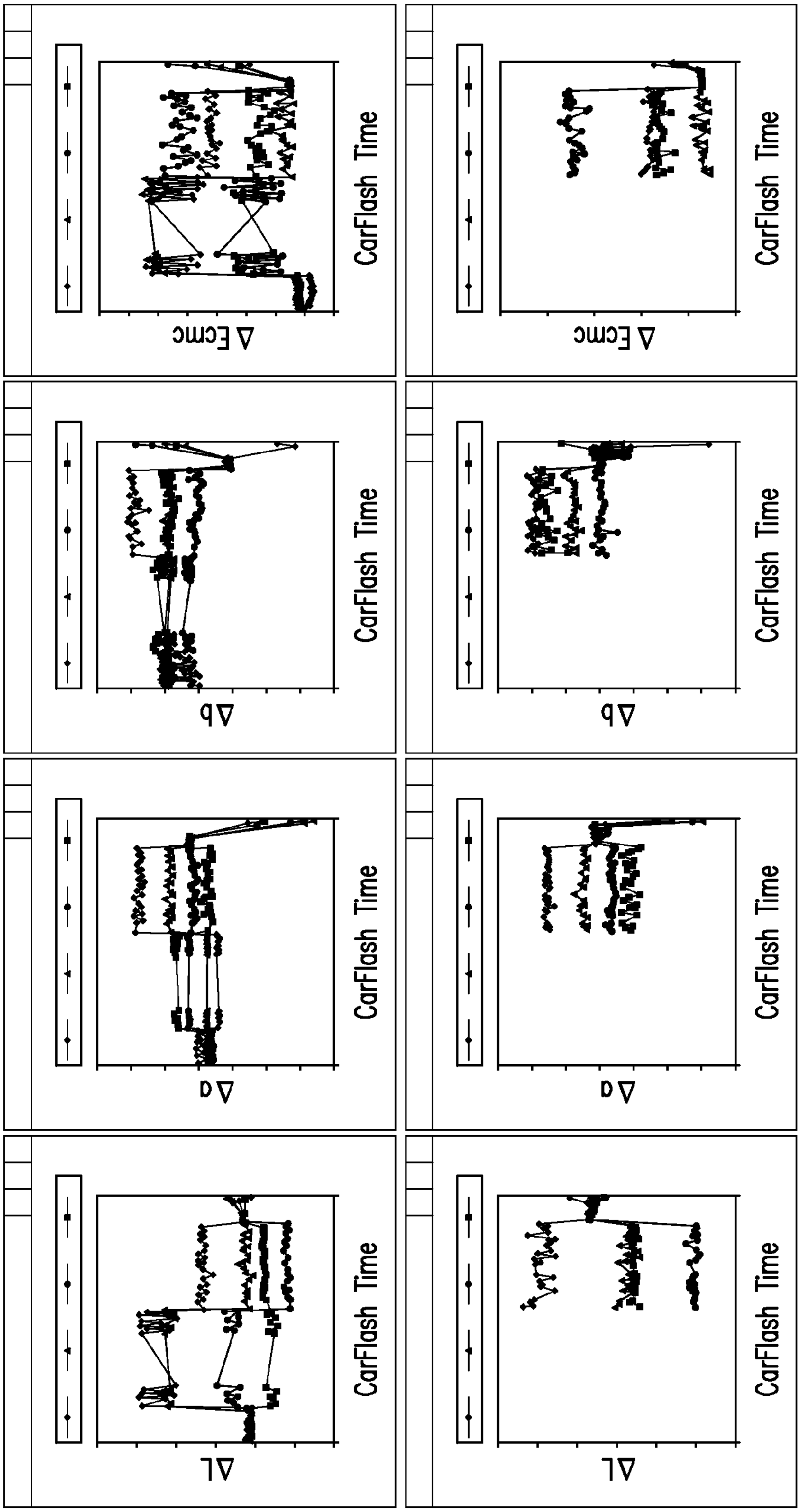
Figure 10D:
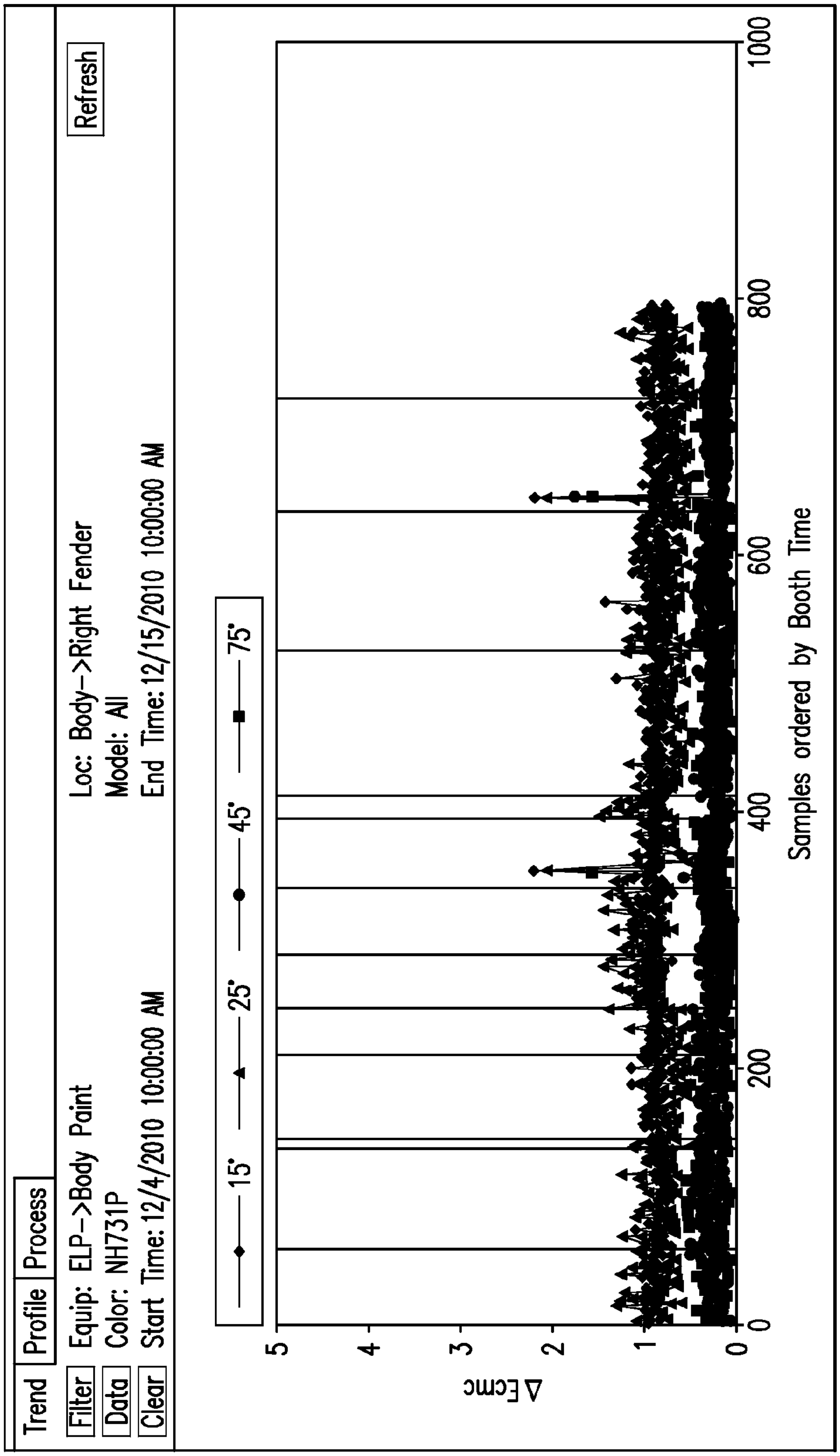

Referring to FIGS. 10A-10D, sample graphs of color trend data according to an example embodiment are shown. The computerized paint monitoring and analysis system supports graphical views of color trend data according to numerous color parameters. FIG. 10A shows L, a, b, and ΔEcmc values for four corners of an automotive body. FIG. 10B shows ΔEcmc values on a right quarter panel. FIG. 10C shows L, a, b, and ΔEcmc values for front and rear middle bumpers on an automotive body. FIG. 10D shows ΔEcmc values for samples ordered by booth time. Vertical lines appearing in the graph allow for event tracking such as shift start, new paint, etc.

Figure 11B:
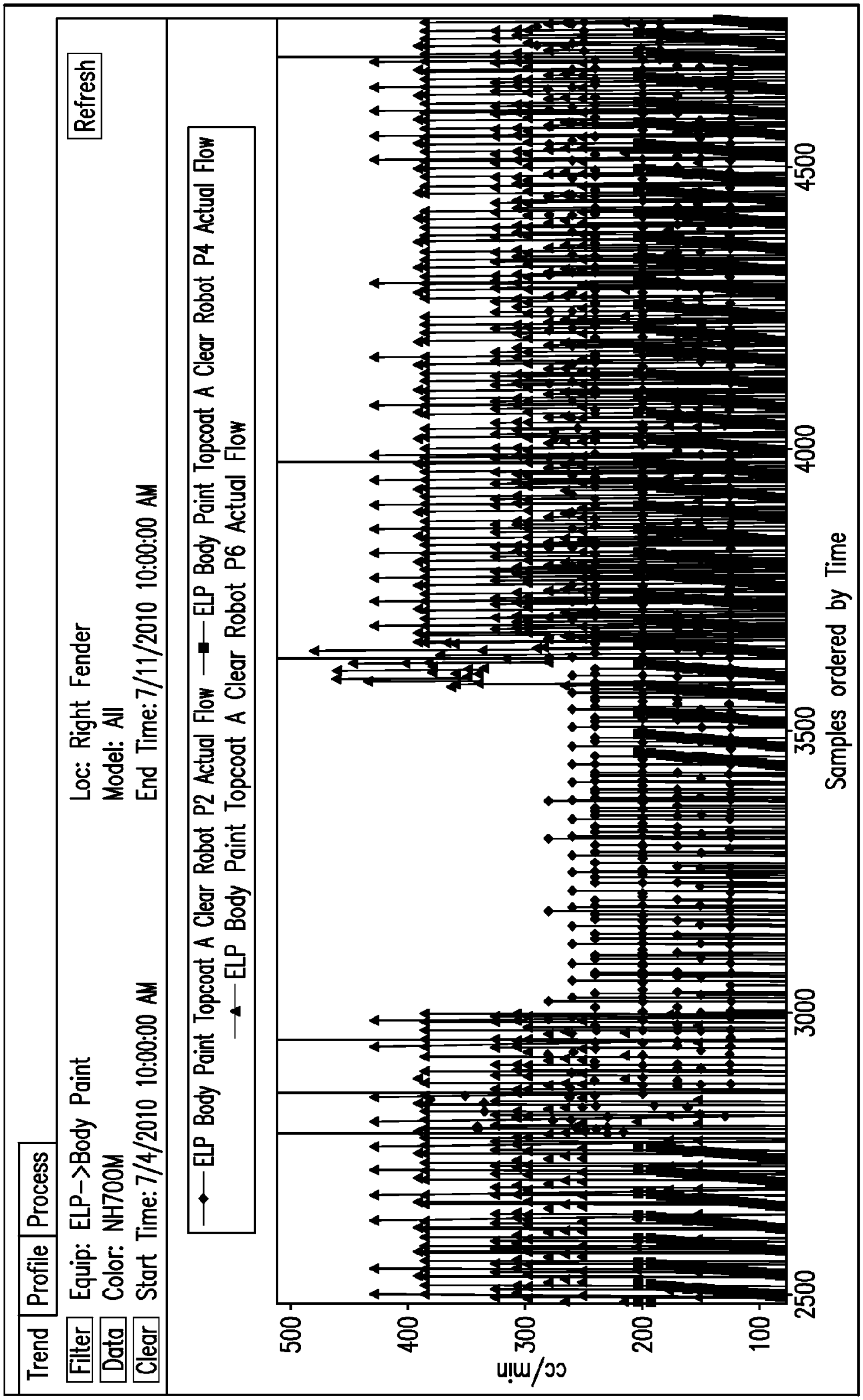

Referring to FIGS. 11A-11B, a sample color detail profile screen according to an example embodiment is shown. A color detail profile feature provides a summary of product evaluation based on criteria selected by an associate. An associate may specify selection criteria as shown in FIG. 11A and view corresponding results as shown in FIG. 11B. The process data as shown in FIG. 11B may be referenced to study the effects on color quality metrics. Vertical lines appearing in the graph allow for event tracking such as shift start, new paint, etc.

Figure 12A:
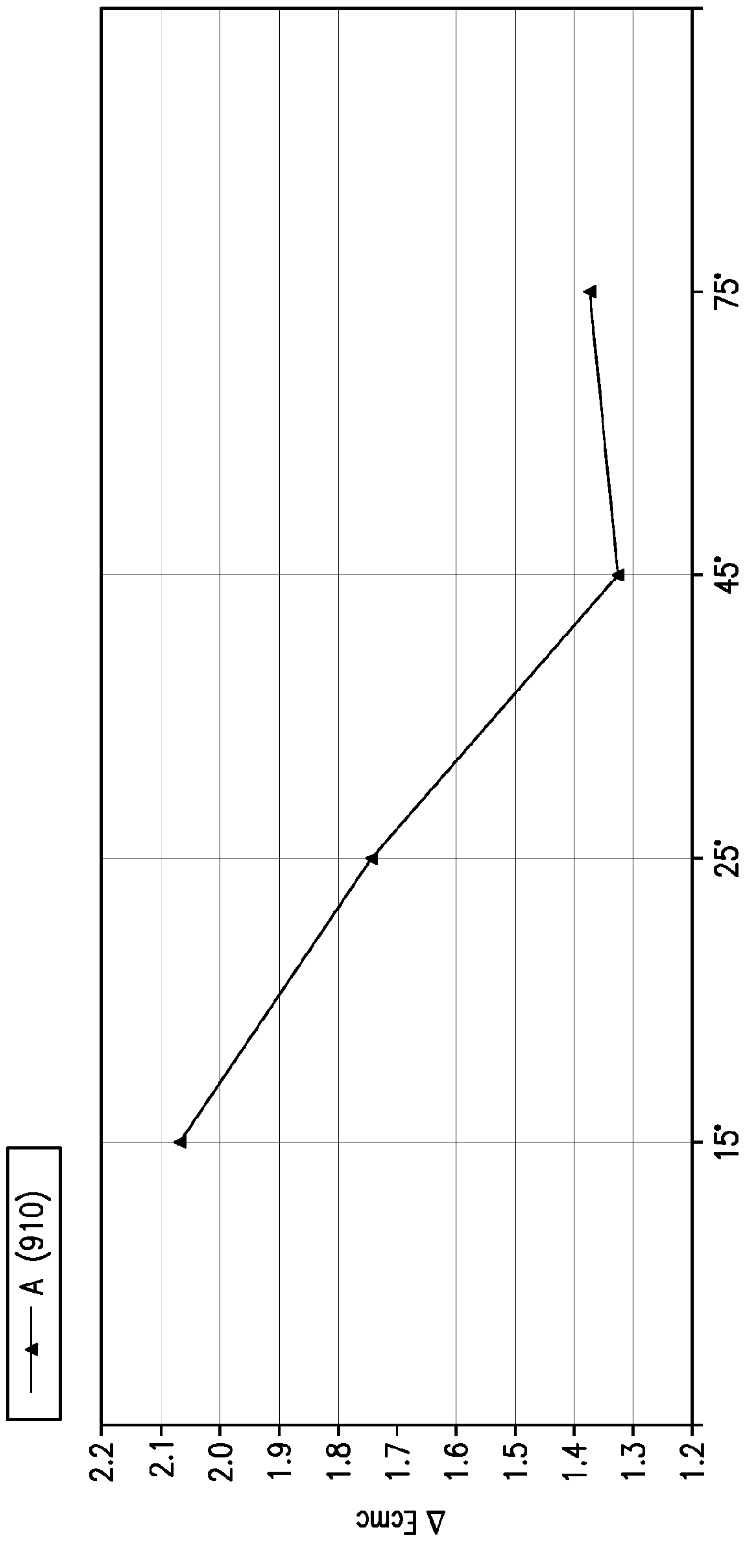
Figure 12C:
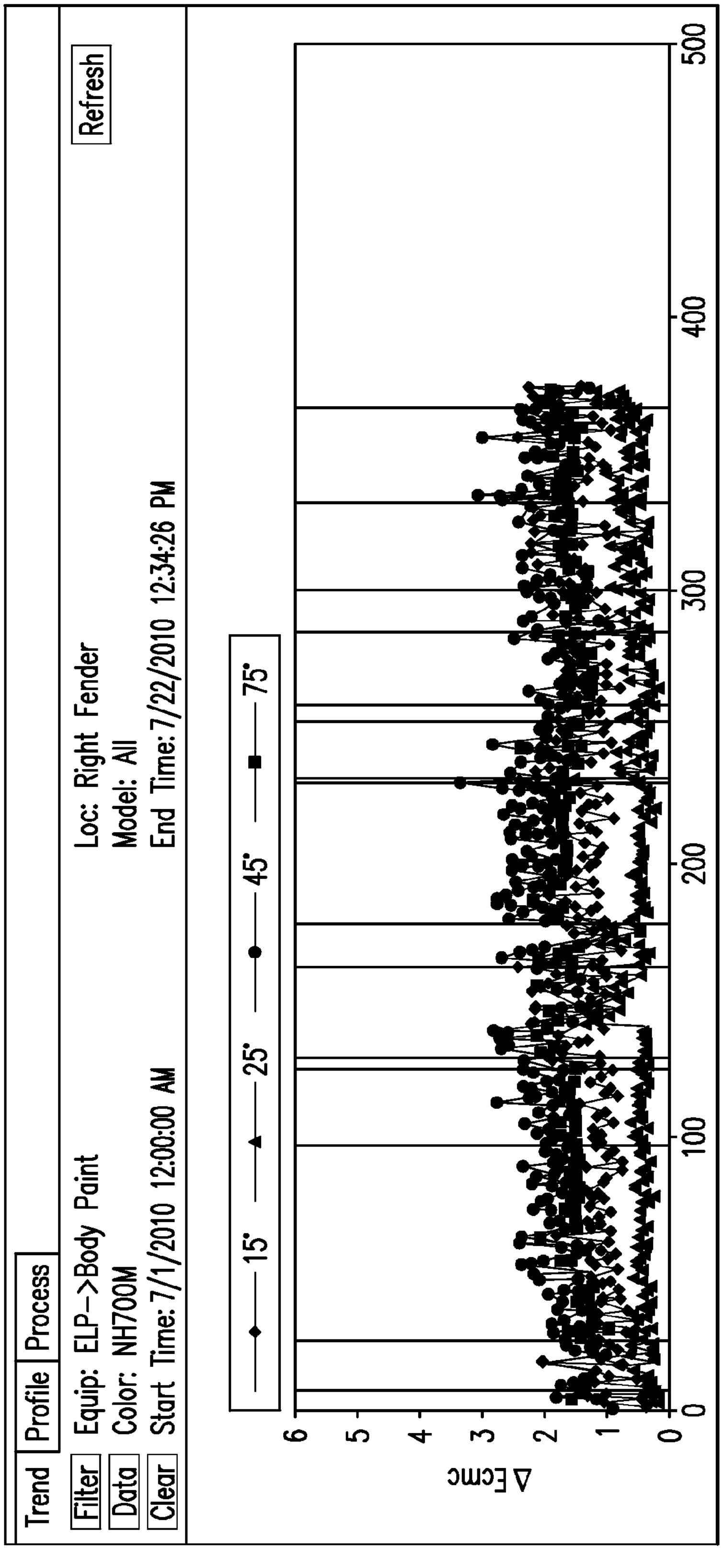

Referring to FIGS. 12A-12C, sample color travel analysis screens according to an example embodiment are shown. Color travel data compares the colorimetric difference between a set of bumpers and a corresponding set of body parts. FIG. 12A provides a graphical view of the data while FIGS. 12B1 and 12B2 provide a tabular view of predetermined color to target success rates. FIG. 12C provides a graphical view of per color target where colors outside a target may be highlighted.

Figure 13B:
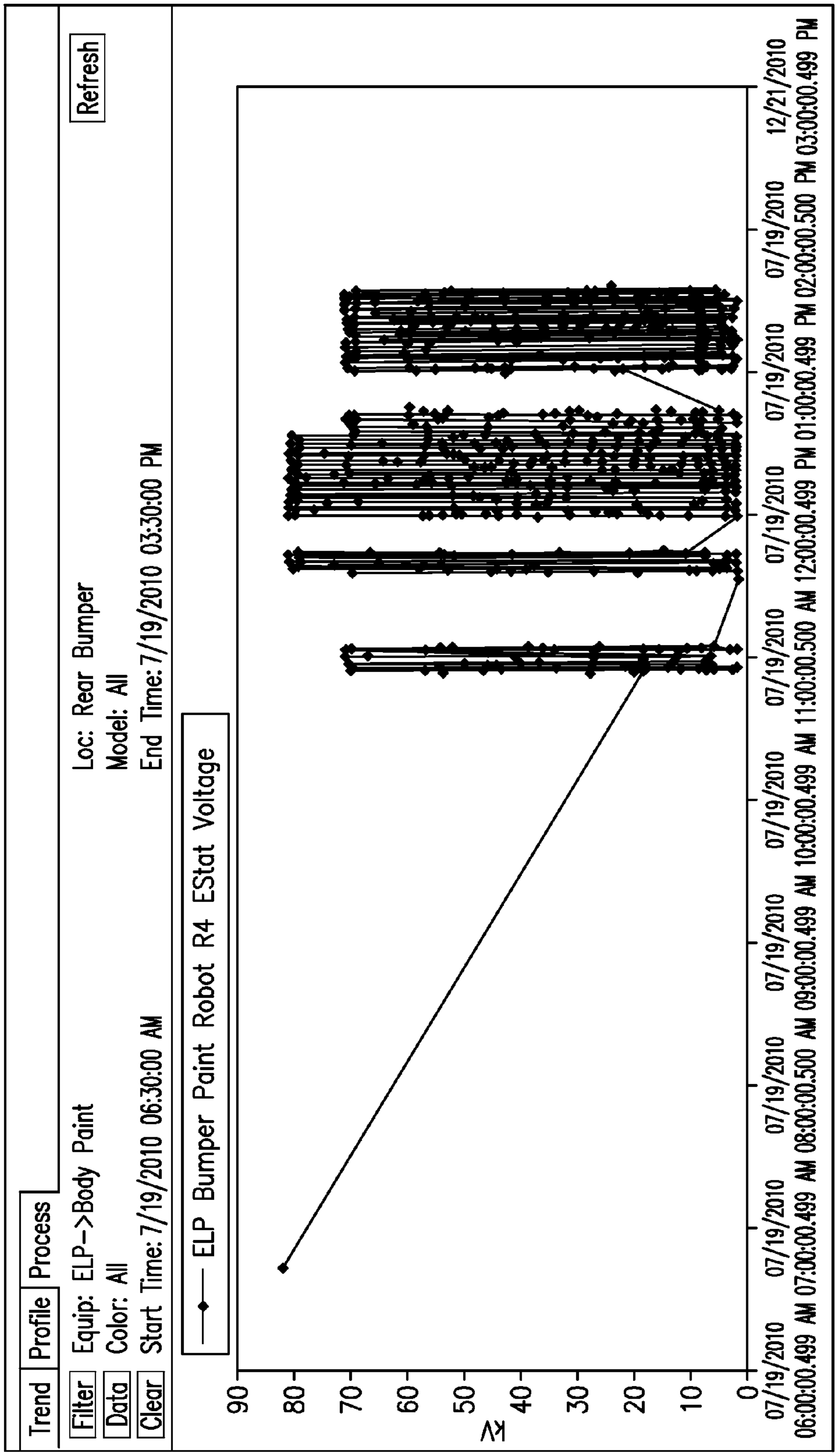
Figure 13D:
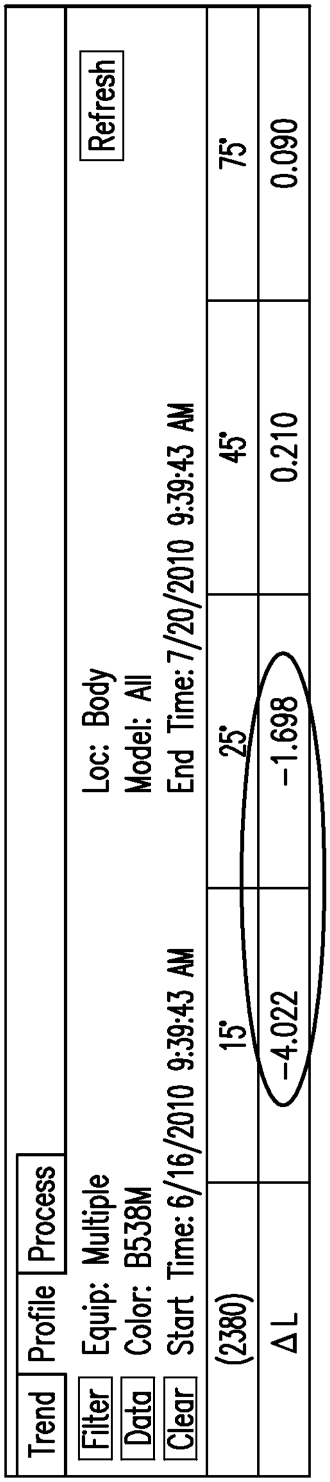

Referring to FIGS. 13A-13G, sample screens for completing a color study according to an example embodiment are shown. FIG. 13A provides a graphical view of Δb colorimetric data over time. In the example, color shifts appear where vertical lines relating to events entered by associates are shown 1300, 1302. A review of associated time data may indicate the color changes occurred at shift starts. Referring to FIG. 13B, a process data study shows loss of current for an electro-static field on the body part. The loss may be attributable to a bad relay. Data values for various fields (e.g., part identifier, part type; location, booth time, car flash time, reference time, equipment; model; carrier, orange peel, surface temperature) may be exported to an analysis package such as Minitab® to analyze the data as shown in FIG. 13C. In the example, the statistical analysis shows the color on the parts is unacceptable. Referring to FIG. 13D, a color luminance study shows the paint characteristics are too dark. The information may be used by an associate to institute countermeasures or corrective action.

Figure 13E:
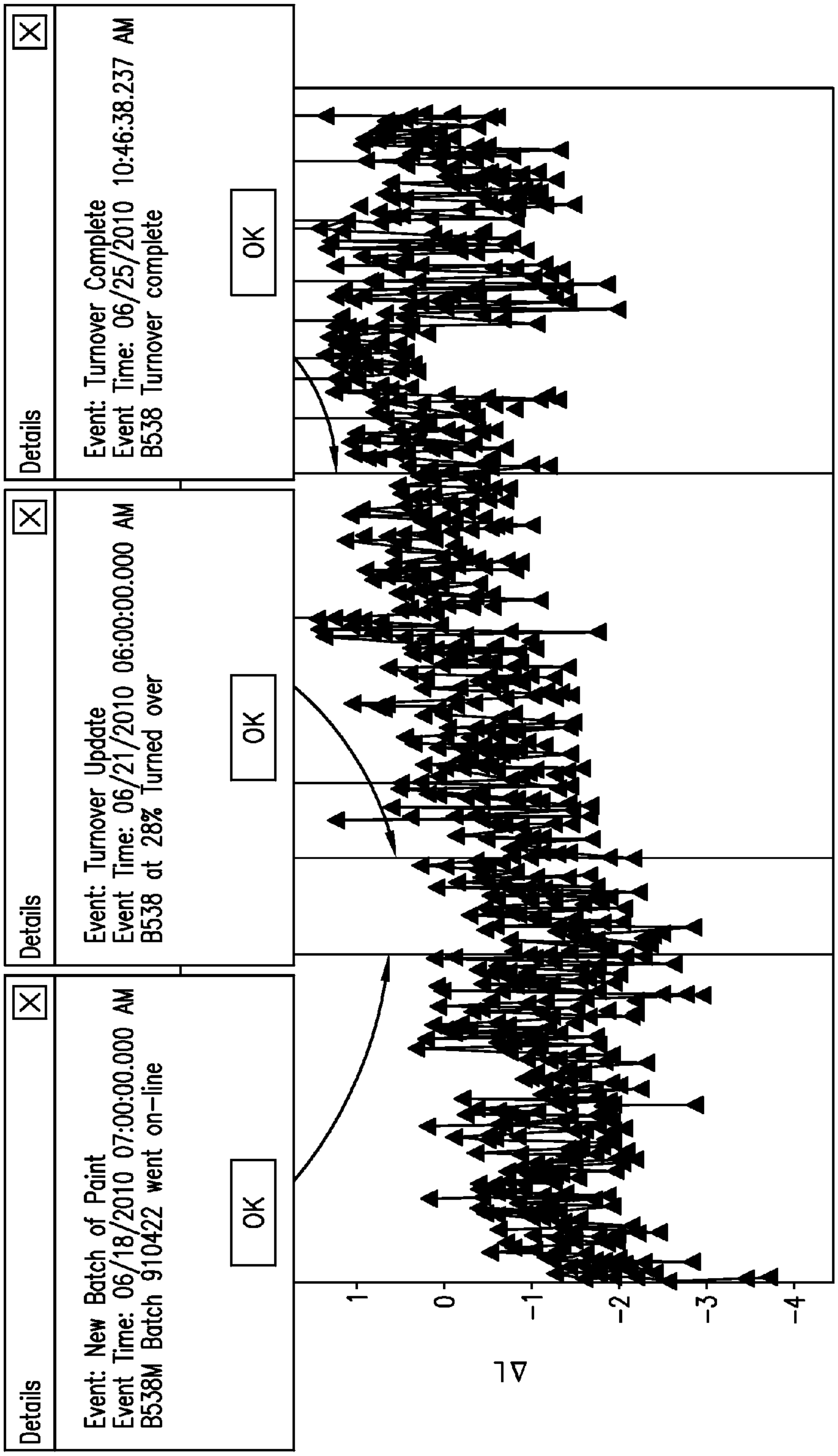
Figure 13G:
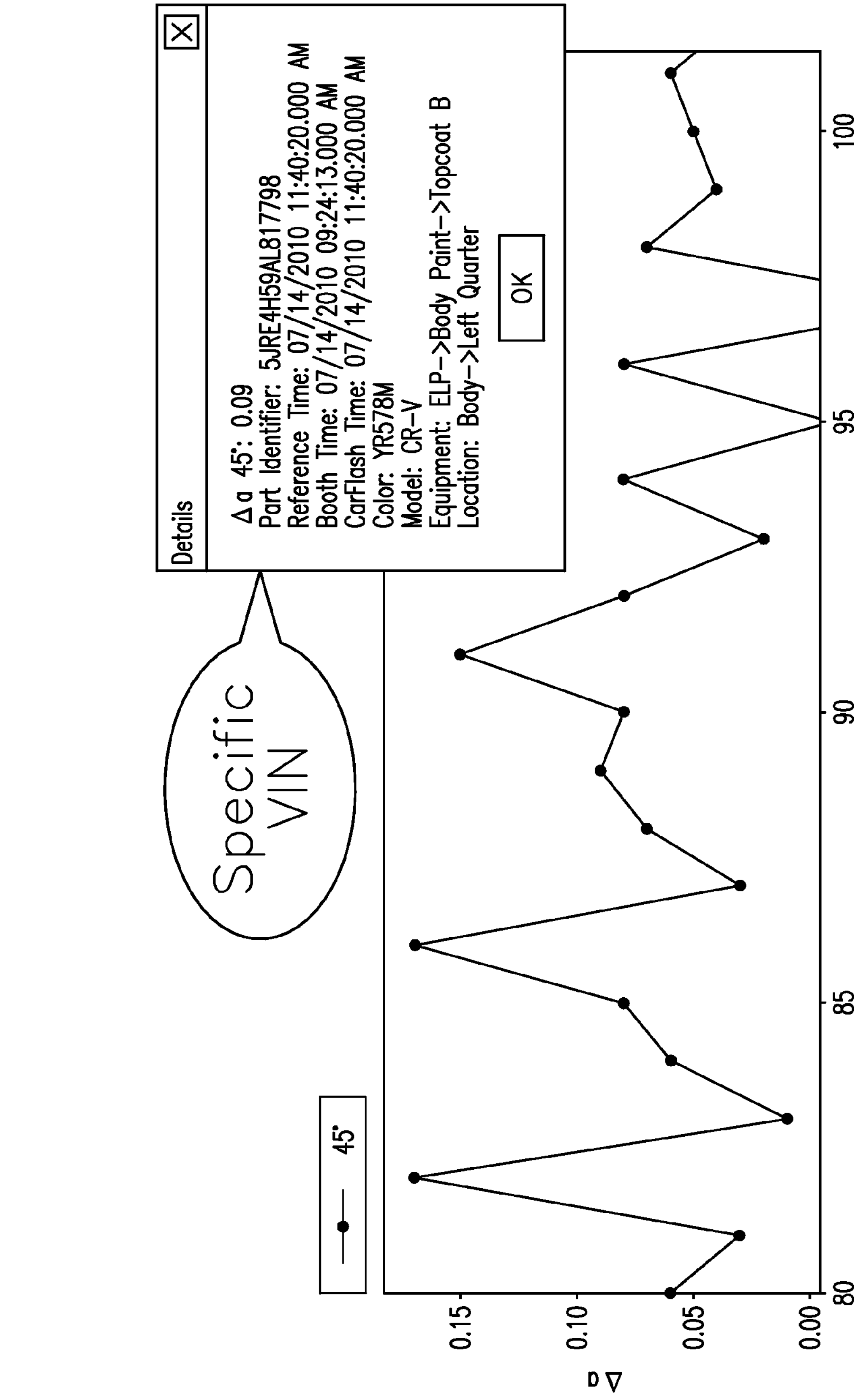

As illustrated in FIG. 13E, an event tracking feature may be used to track the paint material change to a good state. FIG. 13F provides an analysis of bumper-to-body colorimetric data by time average or actual part combination. Referring to FIG. 13G, a specific part may be studied to facilitate diagnosis and correction of the color consistency problem.

Figure 14A:
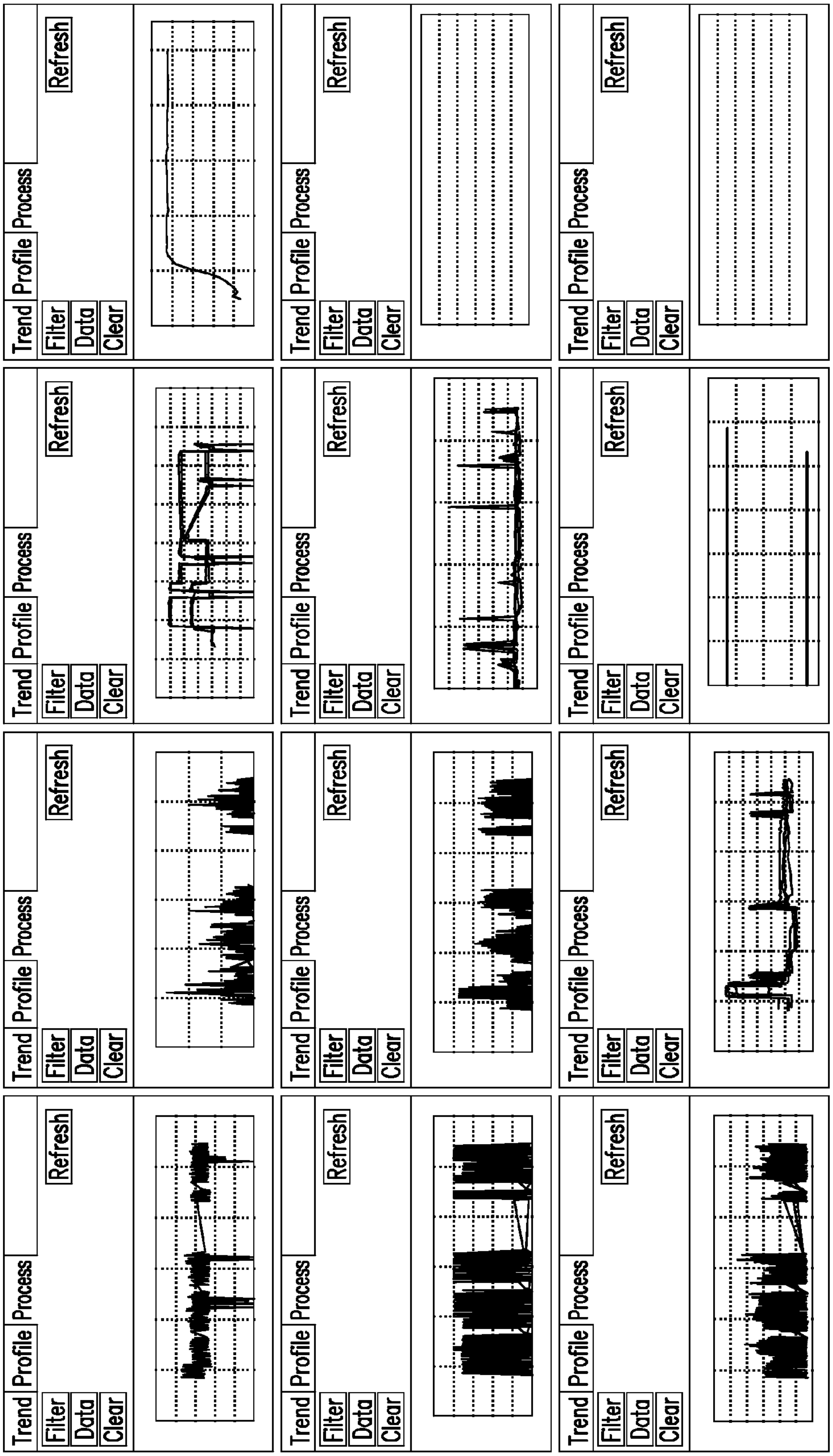
Figure 14B:
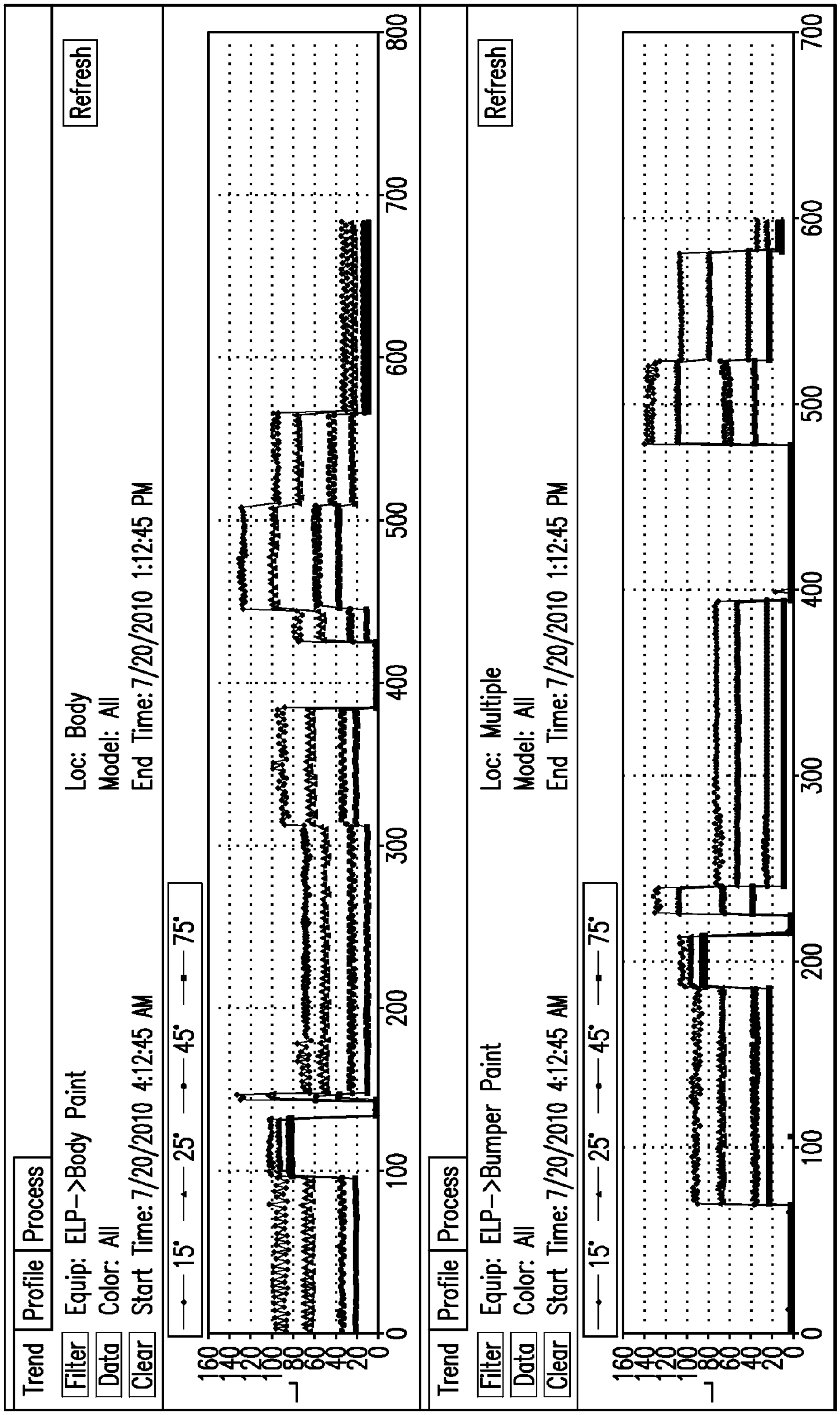
Figure 14C:
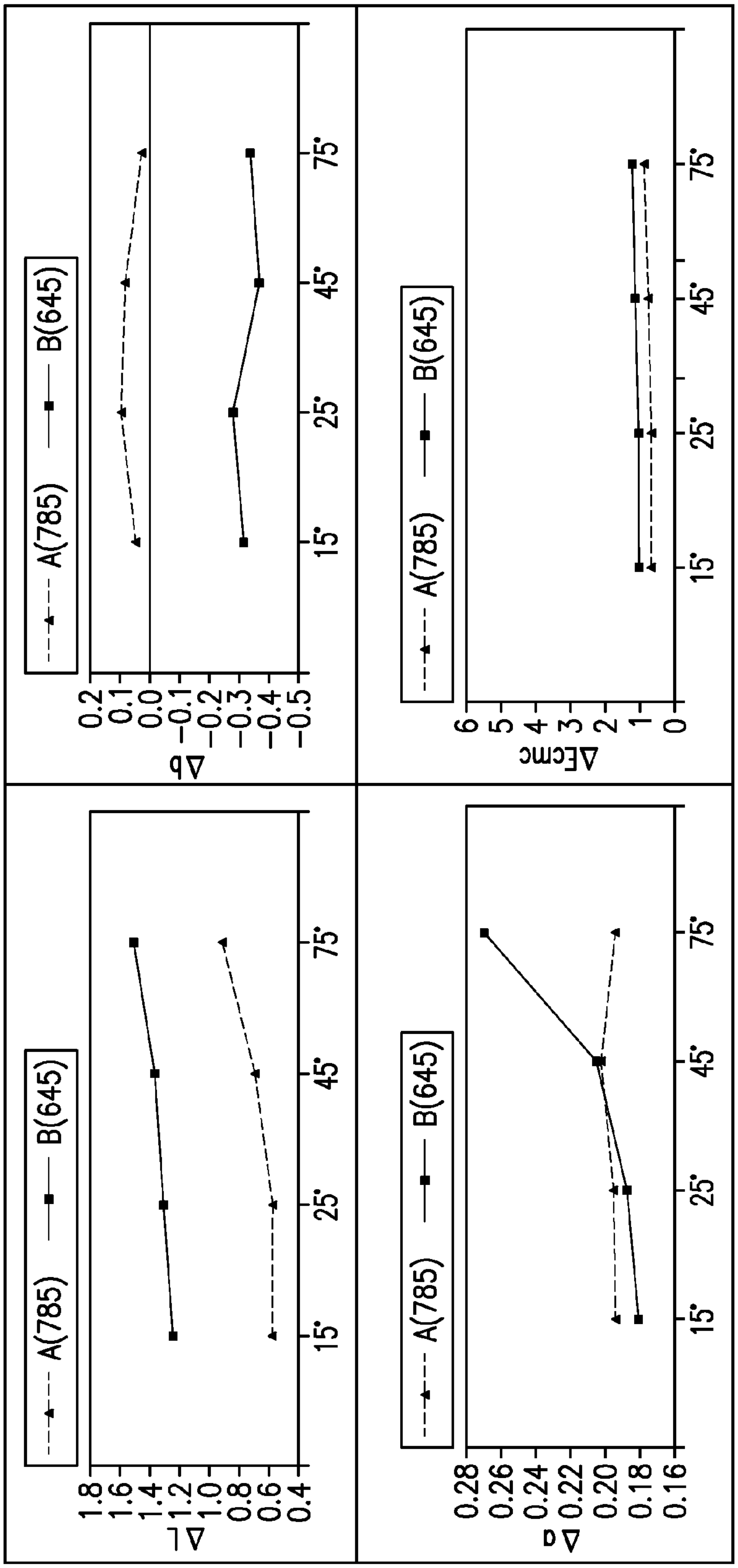

Referring to FIGS. 14A-14D, sample process data graphs according to an example embodiment are shown. As illustrated in FIG. 14A, graphical data for many process parameters (e.g., bell speed, voltage, current, flow rate, cycle time, etc.) may be viewed. As illustrated in FIG. 14B, relationships between bumpers and bodies may be referenced from many paint application process points (e.g., oven, booth entrance/exit for clear/base, etc., colorimetric location, etc.) FIG. 14C provides additional examples of color travel graphs. FIG. 14D provides color profile data that may further assist an associate in identifying color consistency problems.

The data collection and analysis capabilities of the disclosed computerized system and method facilitate the detection and correction of color consistency problems in an automotive assembly plant. Data for numerous paint process variables, including environmental conditions, is collected during the paint application process at numerous locations in the assembly plant. The volume of data that is collected and presented facilities the review and detection of color consistency problems when they occur so that an associate can take corrective action before additional parts are affected by paint process variable changes. The data analysis capabilities facilitate detection of a possible cause for the color consistency problem and related corrective action or countermeasure. Adjustment of one or more paint process parameters (e.g., device/equipment, material, or environmental) may correct the color consistency problem and reduce or prevent further color mismatches of parts on a vehicle.

A computerized paint process monitoring and feedback system and method has been described in reference to the appended figures. The description with reference to figures is made to exemplify the disclosed computerized system and method and is not intended to limit the system and method to the representations in the figures. One of skill in the art would understand that the identification of specific data values that are collected and analyzed could be varied in numerous ways and fall within the scope of the following claims. For example, environmental factors other than temperature and humidity could be measured and analyzed as claimed and fall within the scope of the following claims. From the foregoing description, it can be understood that there are various ways to construct a computerized color harmony system and method while still falling within the scope of the following claims. As such, while certain embodiments of the present invention are described in detail above, the scope of the invention is not to be considered limited by such disclosure, and modifications are possible without departing from the spirit of the invention as evidenced by the following claims:

What is claimed is:

1. A computerized method for analyzing color trend data comprising:

(a) storing in a database for each one of a plurality of body parts:

(i) a body part identifier;

(ii) color measurement data collected during application of a paint color to said body part; and (iii) paint process data collected during application of said paint color to said body part;

(b) storing in said database for each of a plurality of vehicles, a vehicle identification number associated with:

(i) a first body part identifier for a first body part installed on said vehicle; and (ii) a second body part identifier for a second body part installed on said vehicle;

(c) receiving at a server, a request to access said color measurement data associated with each of said body part identifiers during application of said paint color to said body part; and (d) generating at said server for display at a user computer, a screen comprising for each of said vehicle identification numbers, data related to a first color measurement for said first body part identifier and a second color measurement for said second body part identifier.

2. The computerized method of claim 1 wherein said paint process data is selected from the group consisting of device data, material data, and environmental data.

3. The computerized method of claim 2 wherein said environmental data comprises temperature and humidity data for a paint booth.

4. The computerized method of claim 1 further comprising generating at said server for display at a user computer, a screen comprising a color measurement for said first body part identifier and at least one tolerance value for said color measurement.

5. The computerized method of claim 1 wherein said body parts are selected from the group consisting of automotive panels and bumpers.

6. The computerized method of claim 1 further comprising generating at said server for display at a user computer, a screen comprising for each of said vehicle identification numbers, a value for a paint process related to said first body part identifier.

7. The computerized method of claim 1 wherein said screen further comprises paint process data for said first body part identifier and said second body part identifier.

8. A computerized system for analyzing color trend data comprising:

(a) a database for storing for:

(1) for each one of a plurality of body parts:

(A) a body part identifier;

(B) color measurement data collected during application of a paint color to said body part; and (C) paint process data collected during application of said paint color to said body part;

(2) for each of a plurality of vehicles, a vehicle identification number associated with:

(A) a first body part identifier for a first body part installed on said vehicle; and (B) a second body part identifier for a second body part installed on said vehicle; and (b) a server with programming instructions to:

(1) receive at said server, a request to access said color measurement data associated with each of said body part identifiers during application of said paint color to said body part; and (2) generate at said server for display at a user computer, a screen comprising for each of said vehicle identification numbers, data related to a first color measurement for said first body part identifier and a second color measurement for said second body part identifier.

9. The computerized system of claim 8 wherein said paint process data is selected from the group consisting of device data, material data, and environmental data.

10. The computerized system of claim 9 wherein said environmental data comprises temperature and humidity data for a paint booth.

11. The computerized system of claim 8 wherein said screen further comprises a color measurement for said first body part identifier and at least one tolerance value for said color measurement.

12. The computerized system of claim 8 wherein said body parts are selected from the group consisting of automotive panels and bumpers.

13. The computerized system of claim 8 wherein said screen further comprises for each of said vehicle identification numbers, a value for a paint process related to said first body part identifier.

14. A computerized method for analyzing color trend data comprising:

(a) receiving at a server for each one of a plurality of body parts:

(i) a body part identifier;

(ii) color measurement data collected during application of a paint color to said body part; and (iii) paint process data collected during application of said paint color to said body part;

(b) storing in a database said body part identifiers, said color measurement data, and said paint process data;

(c) associating a first body part identifier for a first body part installed on a vehicle with a second body part identifier for a second body part installed on said vehicle, said vehicle having a vehicle identification number;

(d) receiving at said server a request to access said color measurement data associated with each of said first and second body part identifiers during application of said paint color to said body part; and (e) generating at said server for display at a user computer, a screen comprising for said vehicle identification number, data related to a first color measurement for said first body part identifier and a second color measurement for said second body part identifier.

15. The computerized method of claim 14 wherein said paint process data is selected from the group consisting of device data, material data, and environmental data.

16. The computerized method of claim 15 wherein said environmental data comprises temperature and humidity data for a paint booth.

17. The computerized method of claim 14 further comprising generating at said server for display at a user computer, a screen comprising a color measurement for said first body part identifier and at least one tolerance value for said color measurement.

18. The computerized method of claim 14 wherein said body parts are selected from the group consisting of automotive panels and bumpers.

19. The computerized method of claim 14 further comprising generating at said server for display at a user computer, a screen comprising for each of a plurality of vehicles, a value for a paint process related to said first body part identifier.

20. The computerized method of claim 14 wherein said screen further comprises paint process data for said first body part identifier and said second body part identifier.

* * * * *